United States Patent
Iida

(10) Patent No.: US 9,387,822 B2
(45) Date of Patent: Jul. 12, 2016

(54) AIRBAG DEVICE

(71) Applicant: ASHIMORI INDUSTRY CO., LTD., Osaka (JP)

(72) Inventor: Junya Iida, Settsu (JP)

(73) Assignee: Ashimori Industry Co., LTD., Osaka-shi (JP)

( * ) Notice: Subject to any disclaimer, the term of this patent is extended or adjusted under 35 U.S.C. 154(b) by 0 days.

(21) Appl. No.: 14/876,135

(22) Filed: Oct. 6, 2015

(65) Prior Publication Data

US 2016/0121840 A1     May 5, 2016

(30) Foreign Application Priority Data

Oct. 31, 2014   (JP) ................................. 2014-222294

(51) Int. Cl.
| | | |
|---|---|---|
| B60R 21/16 | (2006.01) | |
| B60R 21/2334 | (2011.01) | |
| B60R 21/2165 | (2011.01) | |
| B60R 21/268 | (2011.01) | |

(52) U.S. Cl.
CPC ......... *B60R 21/2334* (2013.01); *B60R 21/2165* (2013.01); *B60R 21/268* (2013.01)

(58) Field of Classification Search
CPC  B60R 21/203; B60R 21/2035; B60R 21/217; B60R 21/261
USPC .............................. 280/728.2, 731, 740, 741
See application file for complete search history.

(56) References Cited

U.S. PATENT DOCUMENTS

| | | | | |
|---|---|---|---|---|
| 5,678,858 A * | 10/1997 | Nakayama | ............ | B60R 21/233 280/728.2 |
| 5,806,883 A * | 9/1998 | Cuevas | ................. | B60R 21/203 280/728.2 |
| 6,042,147 A * | 3/2000 | Nishijima | ............. | B60R 21/217 280/731 |
| 6,648,366 B2* | 11/2003 | Dillon | ................. | B60R 21/2346 280/729 |
| 2001/0024031 A1* | 9/2001 | Ochiai | .................. | B60R 21/276 280/731 |
| 2004/0256846 A1* | 12/2004 | Kahler | .................... | B60R 21/26 280/740 |
| 2006/0267319 A1* | 11/2006 | Frisch | ................. | B60R 21/2037 280/731 |
| 2007/0222196 A1* | 9/2007 | Harvey | ............... | B60R 21/2346 280/740 |
| 2009/0096191 A1* | 4/2009 | Williams | .............. | B60R 21/217 280/728.1 |
| 2010/0201105 A1* | 8/2010 | Iwazato | ................ | B60R 21/201 280/728.3 |

FOREIGN PATENT DOCUMENTS

JP       2004-106841        4/2004

* cited by examiner

*Primary Examiner* — Toan To
(74) *Attorney, Agent, or Firm* — Oblon, McClelland, Maier & Neustadt, L.L.P.

(57) ABSTRACT

An airbag device includes an inflator, an airbag, a holding member, and a gas rectifying member. The holding member has an opening to be formed at least when the airbag initiates to inflate. The holding member restricts the inflation of the airbag toward its outer periphery until the middle of the deployment of the airbag. The gas rectifying member restricts a flow of a gas toward an occupant and has an outlet port that discharges the gas toward the outer periphery of the airbag. When the airbag inflates, the gas rectifying member projects toward the occupant through the opening of the holding member, and the gas of the inflator causes the gas rectifying member to inflate until at least part of the outlet port is located at the occupant side beyond the opening of the holding member.

5 Claims, 21 Drawing Sheets

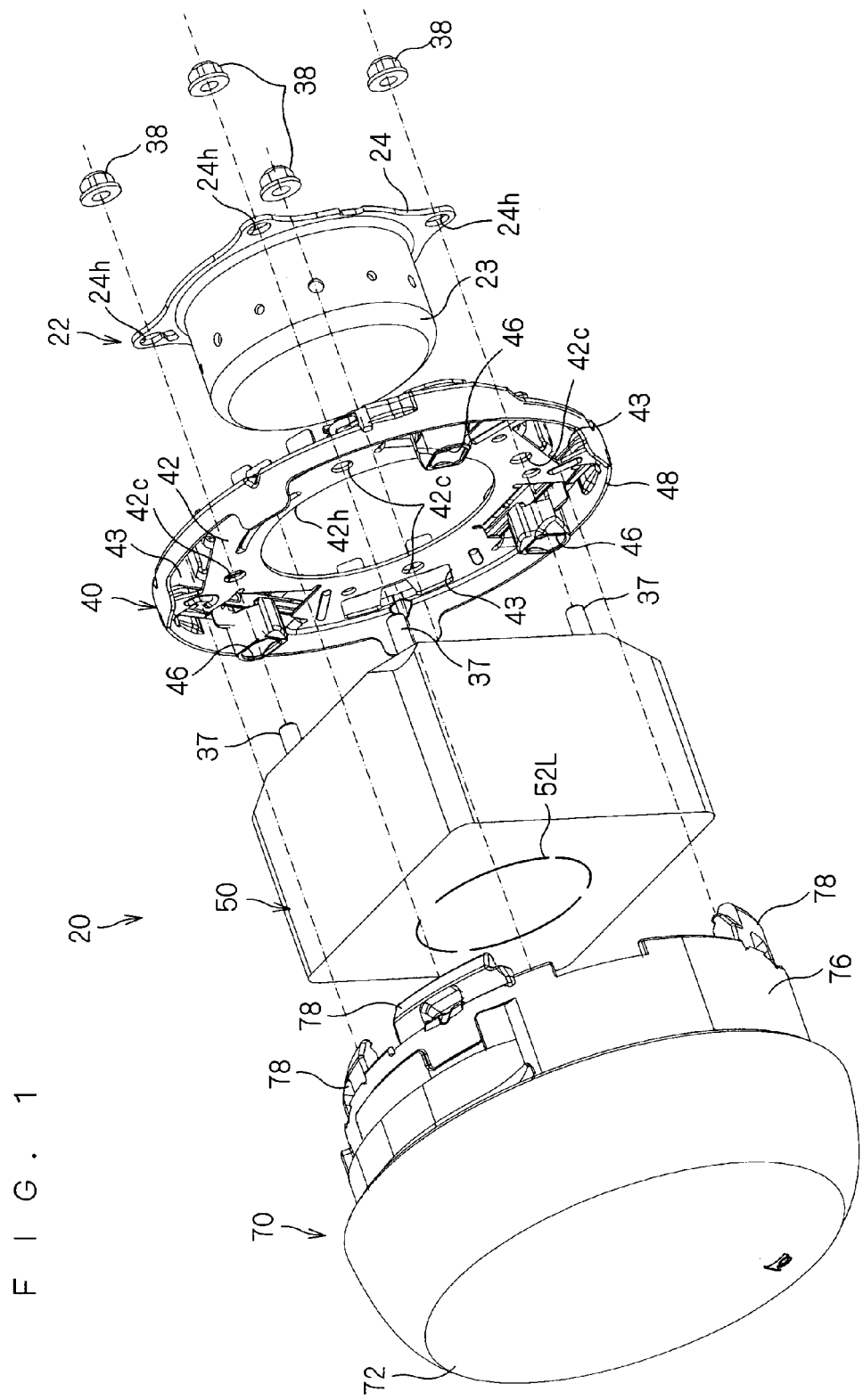

F I G . 9
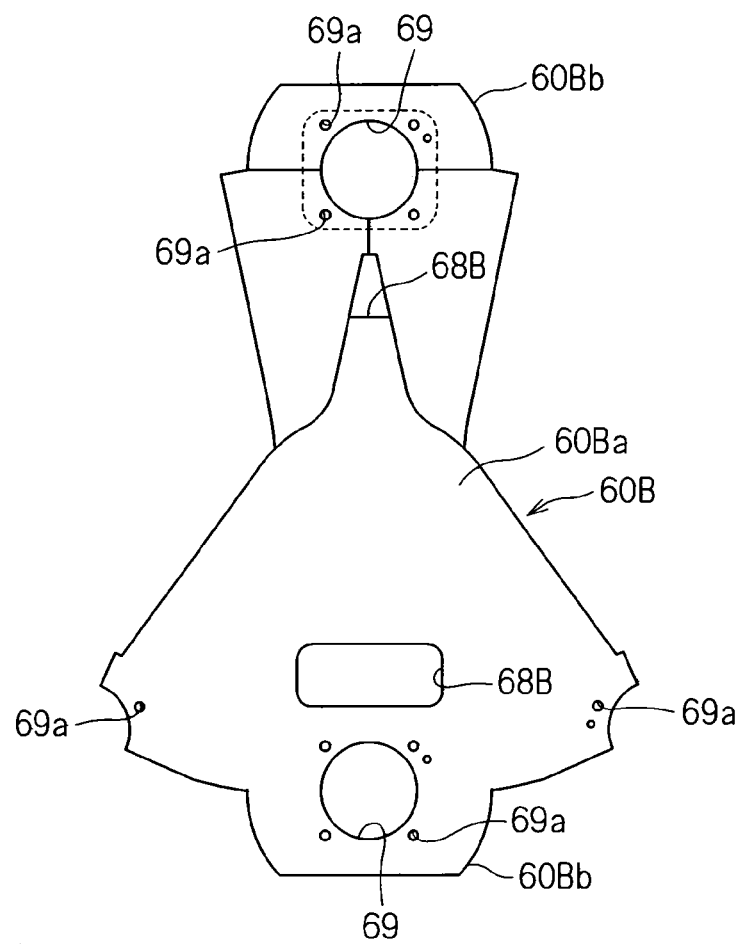

F I G. 1 4
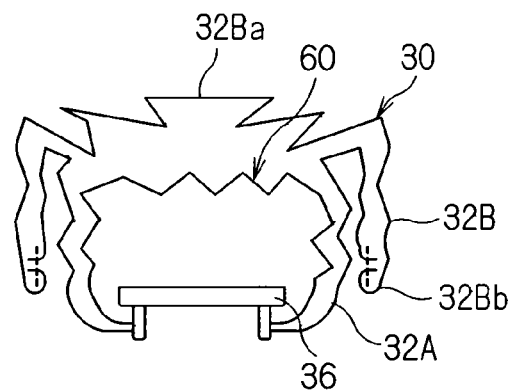
F I G. 1 5
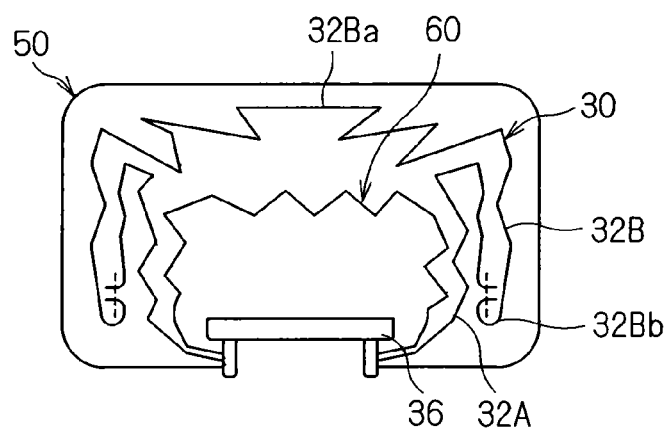

AIRBAG DEVICE

BACKGROUND OF THE INVENTION

1. Field of the Invention

The present invention relates to an airbag device that inflates and deploys to protect an occupant in a vehicle impact.

2. Background Art

Japanese Patent Application Laid-Open No. 2004-106841 discloses an airbag apparatus including a rectifier disposed inside the bag. The rectifier has blowoff openings configured such that the blowoff directions of deflected gas flow (discharged gas flow) are opposite two directions toward the outside of the bag. A first pair of opposite sides of the bag are folded in the blowoff directions of gas flows, and a second pair of opposite sides of the bag are folded in the directions perpendicular to the blowoff directions of gas flow.

According to Japanese Patent Application Laid-Open No. 2004-106841, the bag is designed such that the bag is difficult to be unfolded in the blowoff directions of gas flows from the rectifier and the bag is easy to be unfolded in the directions perpendicular to the blowoff directions of gas flows, allowing a gas in the bag to diffuse uniformly and entirely toward the outer periphery of the bag. Consequently, a pressure toward the occupant by the bag is distributed, to thereby reduce a bag deployment speed.

According to Japanese Patent Application Laid-Open No. 2004-106841, unfortunately, after the first pair of sides and the second pair of sides extend, the gas flows from the blowoff openings of the rectifier flow along and inside these pairs of sides. Thereby, these gas flows are accordingly apt to act as the pressure toward the occupant by the bag.

Thus, if an occupant is in the airbag's deployment area, for example, if the occupant is out of position (OOP), the airbag may hit the occupant with a relatively strong pressure.

SUMMARY OF THE INVENTION

The present invention has an object to restrict the airbag pressure that inflates the airbag toward the occupant rapidly in the middle of and after the deployment of the airbag when the airbag inflates and deploys.

An airbag device according to a first aspect includes an inflator, an airbag, a mounting plate, a holding member, and a gas rectifying member. The inflator is configured to generate a gas. The airbag is configured to inflate by the gas generated by the inflator. To the mounting plate, the inflator and the airbag are mounted. The holding member is fixed to the mounting plate, enclosing said airbag folded therein and has an opening to be formed at least when the airbag initiates to inflate, the opening allowing the airbag to inflate toward an occupant. The holding member restricts the inflation of the airbag toward an outer periphery of the airbag until the middle of the deployment of the airbag. The gas rectifying member is provided in the airbag and covering at least part of the inflator, restricts a flow of the gas from the inflator toward the occupant, and has an outlet port that discharges the gas from the inflator toward the outer periphery of the airbag. When the airbag inflates, the gas rectifying member projects toward the occupant through the opening of the holding member, and at least part of the outlet port is located at an occupant side beyond the opening of the holding member.

According to this airbag device, the gas generated from the inflator flows into the gas rectifying member and then causes the gas rectifying member to inflate. This causes the gas rectifying member to project toward the occupant through the opening of the holding member. Also, the airbag accordingly inflates toward the occupant through the opening of the holding member while being pushed by the gas rectifying member. Before the airbag projects toward the occupant through the opening of the holding member, the airbag is restricted from inflating toward outer periphery thereof by the holding member. Consequently, the portion of the airbag, which is located at the occupant side inflates toward the occupant relatively quickly.

Then, the gas of the inflator is discharged toward the outer periphery of the airbag through the outlet port while its flow toward the occupant is restricted by the gas rectifying member. In this state, at least part of the outlet port is positioned at the occupant side beyond the opening of the holding member. Thus, the gas discharged through the outlet port is discharged to the portion of the airbag, which is pushed toward the occupant through the opening of the holding member and inflates. This causes the portion of the airbag left in the holding member to be drawn through the opening of the holding member. At this time, the gas from the inflator is restricted from flowing toward the occupant by the gas rectifying member and is discharged toward the outer periphery of the airbag through the outlet port. Consequently, the airbag can deploy so as to inflate mainly toward its outer periphery while the inflation speed thereof toward the occupant is reduced.

Thus, the inflation speed of the airbag toward the occupant can be reduced in the middle of and after the deployment of the airbag. This device restricts the airbag pressure that inflates the airbag toward the occupant rapidly in the middle of and after the deployment of the airbag when the airbag inflates and deploys.

In a second aspect, in the airbag device according to the first aspect, the gas rectifying member includes a gas deflecting portion that deflects the gas discharged through the outlet port such that the gas flows toward the mounting plate as well the outer periphery of the airbag.

This more reliably restricts a flow of the gas from the inflator toward the occupant.

In a third aspect, in the airbag device according to the first or second aspect, the opening of the holding member is smaller than an outer shape of a portion of the airbag folded, the portion facing the opening of the holding member.

In this case, the opening of the holding member is smaller than the outer shape of the airbag folded, which faces the opening of the holding member. Thus, when the airbag is drawn through the opening of the holding member, a portion of the airbag folded, which is located at around the inflator is pressed to the holding member by the generated gas. Thus the airbag is restricted that deploy toward the occupant through the opening of the holding member while maintained folding thereof. Therefore, an amount of the airbag is drawn toward the occupant beyond the opening of the holding member can be controlled to reduce the inflation speed of the airbag toward the occupant.

In a fourth aspect, in the airbag device according to the third aspect, the holding member is an airbag cover including a cover main body and a side wall. The cover main body covers the airbag from the occupant side and is torn by the inflation of the airbag to form the opening. The side wall is integrally formed with the cover main body at back side thereof and surrounds the airbag.

Thus, the airbag cover can be used as a holding member, leading to a cost reduction.

In a fifth aspect, in the airbag device according to any one of the first to fourth aspects, said airbag includes a facing portion of the airbag facing the opening of the holding member during the inflation of the airbag and being located inside the opening within the holding member, and a portion of the airbag around the facing portion is folded within the holding member so as to shrink in a direction in which the airbag projects toward the occupant. Part of the gas rectifying member is disposed inside the facing portion.

According to the fifth aspect, the facing portion of the airbag, which faces the opening of the holding member during the inflation of the airbag, is located inside the opening within the holding member, and part of the gas rectifying member is disposed inside the facing portion. Therefore, when the gas from the inflator causes the gas rectifying member to inflate, the facing portion of the airbag is pushed toward the occupant through the opening of the holding member. The portion of the airbag around the facing portion is folded within the holding member so as to shrink in the direction in which the airbag projects toward the occupant. The gas discharged through the outlet port of the gas rectifying member thus causes the portion of the airbag around the facing portion to be sequentially drawn from the holding member with ease, so that the airbag can smoothly inflate toward its outer periphery.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an exploded perspective view showing the overall configuration of an airbag device according to a preferred embodiment;

FIG. 9 is another explanatory view showing the procedure of forming the gas rectifying member from gas-rectifying-member-forming base fabric;

FIG. 14 is still another explanatory view showing the procedure of housing the airbag;

FIG. 15 is still another explanatory view showing the procedure of housing the airbag;

DESCRIPTION OF THE PREFERRED EMBODIMENTS

{Preferred Embodiment}

An airbag device according to a preferred embodiment is described below.

<Overall Configuration>

Figure 2:
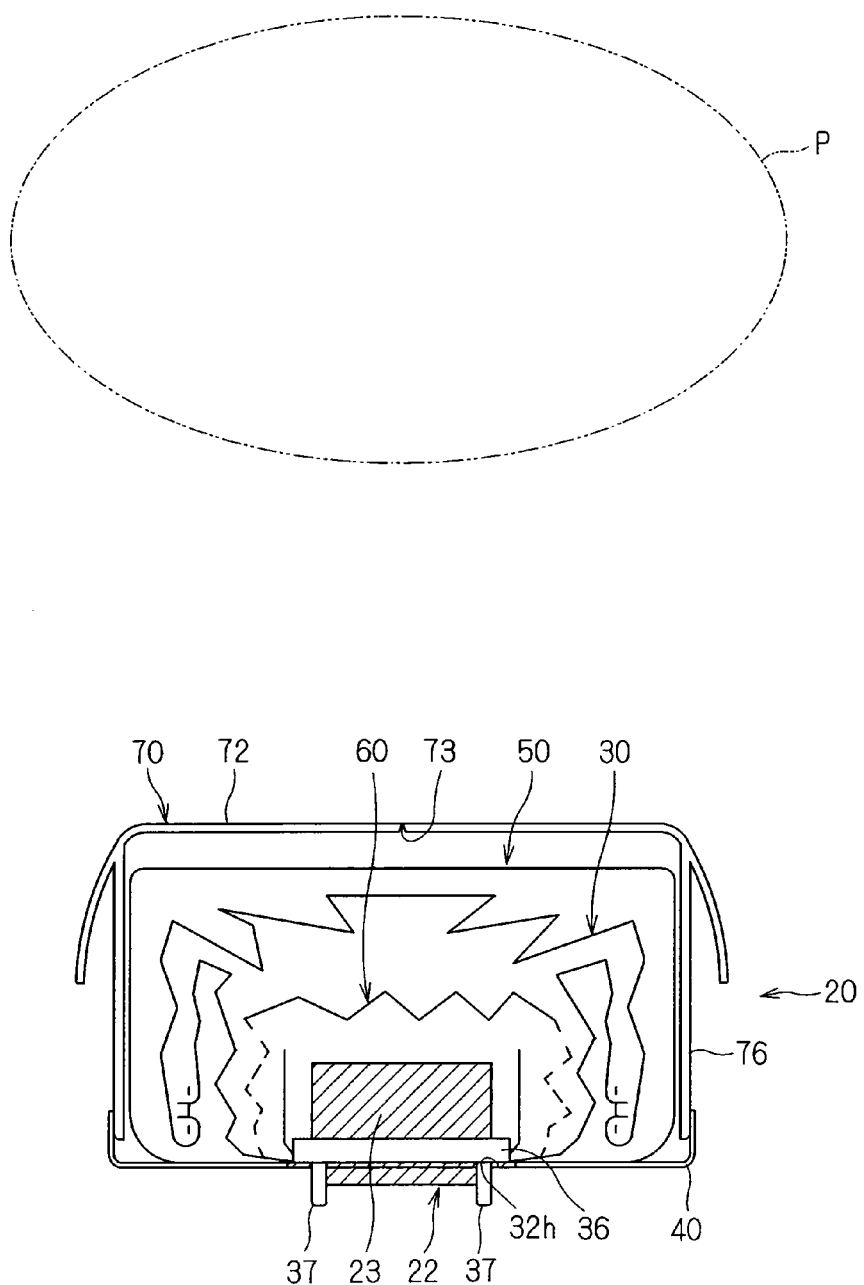
FIG. 2 is a schematic cross-sectional view showing the airbag device.
Figure 3:
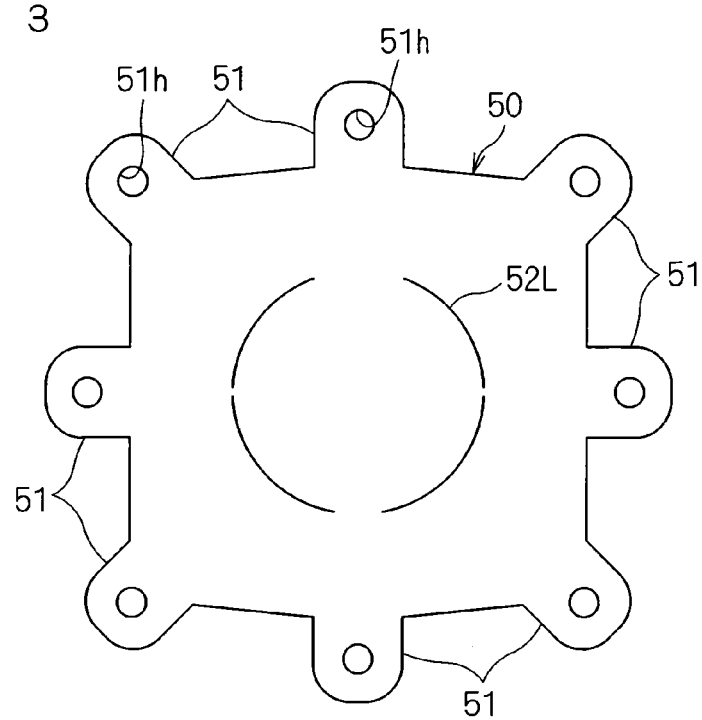
FIG. 3 is an explanatory view showing a process of enclosing a folded airbag by a holding member.

FIG. 1 is an exploded perspective view showing the overall configuration of an airbag device 20. FIG. 2 is a schematic cross-sectional view showing the airbag device 20.

The airbag device 20 is mounted to a steering wheel in a vehicle. Herein, the steering wheel is provided in front of a driver's seat of the vehicle to steer the vehicle.

The steering wheel is generally configured such that an annular wheel main body is entirely fixed through a spoke to an outer periphery of a central member coupled to the tip portion of a steering shaft. The airbag device 20 is fixed to the central member and is disposed while being fixed to the central portion of the wheel main body.

The airbag device 20 includes an inflator 22, an airbag 30, a mounting plate 40, a holding member 50, and a gas rectifying member 60.

The inflator 22 is configured to generate a gas. Herein, the inflator 22 includes a short-cylinder-shaped inflator main body 23 and a mounting flange 24 provided on the outer periphery of the inflator main body 23. Incorporated in the inflator main body 23 are an ignition device, a gas generating agent, and the like. When the inflator 22 receives a detection signal from, for example, an impact detecting part in a vehicle impact, the ignition device ignites the gas generating agent.

As a result, the gas generating agent burns, and subsequently, the gas generated through the burning is supplied into the airbag 30. Consequently, the airbag 30 inflates and deploys toward an occupant P (driver). Herein, gas ejection ports are formed in the outer periphery of the inflator main body 23, and the gas is mainly ejected toward the outside of the inflator main body 23 in its radial direction.

The mounting flange 24 is formed into a piece of plate extending from the outer periphery of the inflator main body 23. Formed equidistantly on the outer periphery of the mounting flange 24 are a plurality of fixing holes 24h.

The airbag 30 is formed into a bag from a flexible sheet-shaped member such as fabric or plastic sheet. Herein, the airbag 30 is formed into a bag by joining the outer peripheries of two pieces of disk-shaped base fabric by, for example, sewing (see FIG. 11). At the central portion of one of the two pieces of base fabric is formed an opening 32h for disposing the inflator main body 23. The airbag 30 is folded to be housed in the cover (airbag cover) 70. The gas generated by the inflator 22 causes the airbag 30 to inflate and then deploy into a flat spheroid between the steering wheel and the occupant P.

The airbag may deploy into an elongated bag. The shape into which the airbag inflates and deploys is set to such a shape that can effectively receive an impact upon an occupant, in consideration of a place at which the airbag is installed, the positional relationship between the place of installation and the occupant, and the like.

The mounting plate 40 is a member to which the inflator 22 and the airbag 30 are mounted.

Herein, the mounting plate 40 is a member formed of, for example, a metal plate and includes a circular plate portion 42 and a peripheral wall 48 formed around the outer periphery of the circular plate portion 42.

At the central portion of the circular plate portion 42 is formed an opening 42h, and the inflator main body 23 is disposed in the opening 42h. Around the outer periphery of the opening 42h of the circular plate portion 42 are formed screw insertion holes 42c. The airbag 30, the inflator 22, and the like are mounted to the mounting plate 40 through the screw insertion holes 42c.

Around the opening 32h in the airbag 30 is disposed a retainer bracket 36 (see FIG. 2). The retainer bracket 36 is a member formed of a metal plate or the like and, herein, is formed into substantially a rectangular plate. At the central portion of the retainer bracket 36 is formed an opening in which the inflator main body 23 can be disposed. Provided at the corners of the retainer bracket 36 in a projecting manner are screw portions 37. With the retainer bracket 36 disposed in the airbag 30, the screw portions 37 project toward the outside of the airbag 30 through holes formed around the opening 32h in the airbag 30. The inflator main body 23 is disposed in the opening 42h of the mounting plate 40, and the mounting flange 24 is disposed while overlapping the mounting plate 40 with the fixing holes 24 thereof disposed at the positions same as those of the screw insertion holes 42c. In this state, the retainer bracket 36 and the mounting flange 24 of the inflator 22 are caused to overlap the mounting plate 40 such that the screw portions 37 projecting from the airbag 30 project toward the rear surface of the inflator 22 (opposite to the occupant P) through the screw insertion holes 42c and the fixing holes 24h. Then, nuts 38 are threadedly engaged with the screw portions 37. Consequently, the inflator 22 is mounted to the mounting plate 40, and with a peripheral portion of the opening 32h of the airbag 30 retained between the retainer bracket 36 and the mounting plate 40, the airbag 30 is mounted to the mounting plate 40. In this state, at least part of the inflator 22 is disposed in the airbag 30 so that the gas generated in the inflator 22 can be supplied into the airbag 30.

Formed in the mounting plate 40 are fixing holes 46 that allow locking members provided in, for example, the central member on the steering wheel side to be fitted and fixed thereinto. The configuration for mounting the airbag device 20 to the steering wheel is not limited to the above-mentioned configuration. The mounting plate may be mounted to the steering wheel with, for example, a screwing structure or a configuration for fitting and fixing locking portions projecting on the mounting plate side into fixing holes formed in, for example, the central member on the steering wheel side.

The holding member 50 is fixed to the mounting plate 40 while surrounding the airbag 30 folded. Herein, the holding member 50 encloses the periphery of the folded airbag 30 and covers the portion of the folded airbag 30 opposite to the mounting plate 40. Alternatively, the holding member 50 may be configured to enclose only the outer periphery of the folded airbag 30. Before the airbag 30 inflates, the holding member 50 is expected to keep the airbag 30 folded.

Figure 18:
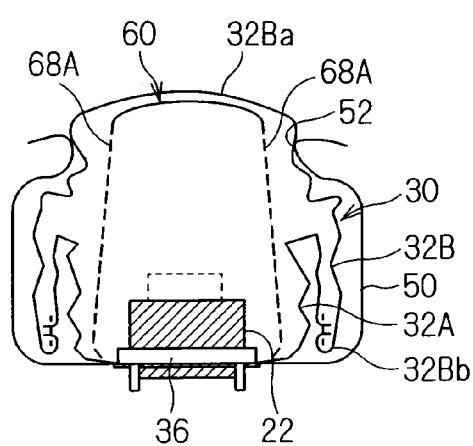
FIG. 18 is still another explanatory view showing the operation of the airbag device.

At least when the airbag 30 initiates to inflate, an opening 52, which allows the airbag 30 to inflate toward the occupant P, is formed in the holding member 50 (see FIG. 18). Herein, in the occupant P-side portion of the holding member 50, a rupture line 52L is formed circularly with a to-be-hinge portion left. The rupture line 52L is formed by alternately forming cut portions and not-to-be-cut portions. This allows the holding member 50 to cover the occupant P-side portion of the airbag 30 before the airbag 30 inflates. When inflating, the holding member 50 ruptures along the rupture line 52L to form the opening 52, allowing the airbag 30 to inflate toward the occupant P through the opening 52.

Up to the middle of the deployment of the airbag 30 before it is yet to fully deploy, the holding member 50 encloses the outer periphery of the airbag 30, thereby restricting the inflation of the airbag 30 toward its outer periphery.

The gas rectifying member 60 is provided in the airbag 30 while covering at least part of the inflator 22. The gas rectifying member 60 restricts a flow of the gas from the inflator 22 toward the occupant P and rectifies the gas from the inflator 22 such that the gas from the inflator 22 flows toward the outer periphery of the airbag 30. In particular, when the airbag 30 inflates, the gas rectifying member 60 projects toward the occupant P through the opening 52 of the holding member 50. In this state, at the position beyond the opening 52 of the holding member 50 at the occupant side, the gas from the inflator 22 is rectified so as to flow toward the outer periphery of the airbag 30 by the gas rectifying member 60, thereby causing the airbag 30 to inflate mainly toward its outer periphery.

The holding member 50 and the gas rectifying member 60 are further described below.

The airbag device 20 includes a cover 70. The cover 70 is a member for covering the airbag 30 folded. Herein, the cover 70 is a member formed of plastic or the like and includes a cover main body 72 and a side wall 76.

The cover main body 72 is formed into a dome that is curved gently. With the airbag device 20 mounted to the steering wheel, the occupant P-side portion of the cover main body 72 is disposed so as to be continuous with the plastic portion covering a spoke portion of the steering wheel while being flush with the plastic portion. The cover main body 72 is not necessarily required to have the above-mentioned shape and may include a portion covering at least the occupant P-side portion of the folded airbag 30.

Backside the cover main body 72 is formed a tear line 73 for forming an opening that allows the airbag 30 to pass therethrough when the airbag 30 inflates (see FIG. 2). The tear line 73 is normally formed by forming a groove on the backside surface of the cover main body 72. The cover main body 72 is partially thin-walled at the portion at which the tear line 73 is formed. When the airbag 30 initiating to inflate abuts against the inside surface of the cover main body 72, accordingly, the cover main body 72 tears along the tear line 73, thereby forming an opening for the airbag 30 to inflate. The tear line 73 is conceivably formed into, an H shape, a U shape, a radial shape, or any other shape in the backside surface of the cover main body 72.

The side wall 76 is formed so as to surround the airbag 30 disposed while being folded at the inside surface side of the cover main body 72. Herein, the side wall 76 is formed into a cylindrical shape. Alternatively, the side wall 76 may be formed into a square tube shape or such a shape that partially surrounds the airbag 30. The airbag 30 folded is housed in the space defined by the cover main body 72 and the side wall 76.

The cover main body 72 is mounted to the mounting plate 40.

Specifically, the mounting plate 40 is formed into a plate-shaped member that is extended so as to close the opening of the side wall 76. With the circular plate portion 42 closing the opening of the side wall 76, the peripheral wall 48 is fitted onto the outer peripheral edge portion of the opening of the side wall 76.

At the distal edge portion of the side wall 76 are formed fixing pieces 78 extending toward the mounting plate 40. Herein, a plurality of (here, four) fixing pieces 78 are formed from a plurality of (here, four) locations spaced on the peripheral edge portion of the opening of the side wall 76.

Formed in the mounting plate 40 are fixing holes 43 into which the fixing pieces 78 are inserted. More specifically, the fixing holes 43 are formed at a plurality of (here, four) positions individually corresponding to the fixing pieces 78 in the circular plate portion 42 of the mounting plate 40. The fixing hole 43 is formed into an elongated hole into which the fixing piece 78 can be inserted. The fixing pieces 78 are inserted into the fixing holes 43 and are then engaged with peripheral portions of the fixing holes 43 so as not to come off, so that the cover 70 is mounted to the mounting plate 40.

The airbag device 20 is not necessarily required to include the cover 70.

<Holding Member>

The holding member 50 is described more specifically. FIGS. 3 to 6 are explanatory views showing the process of enclosing, by the holding member 50, the airbag 30 folded.

The holding member 50 is formed of a flexible sheet-shaped member such as fabric or plastic sheet and is extended so as to enclose the airbag 30 folded therein except for the portion in which the opening 32h is formed. The holding member 50 may have a rectangular shape, any other polygonal shape (for example, an octagonal shape), or a circular shape before enclosing the folded airbag 30. Around the holding member 50, a plurality of mounting pieces 51 are formed at intervals. Herein, eight mounting pieces 51 are formed around the holding member 50 at intervals. Each mounting piece 51 has a screw insertion hole 51h through which the screw portion 37 can be inserted.

The rupture line 52L is formed at the central portion of the holding member 50. When the airbag 30 inflates, the holding member 50 ruptures along the rupture line 52L, thereby forming the opening 52 that allows the airbag 30 to inflate toward the occupant P. The rupture line 52L and the opening 52, which may be formed in any other polygonal shape (for example, a square shape), is preferably set to be smaller than the outer shape of the folded airbag 30 (the outer shape of the folded airbag 30 seen from the outside of the opening 52).

Figure 4:
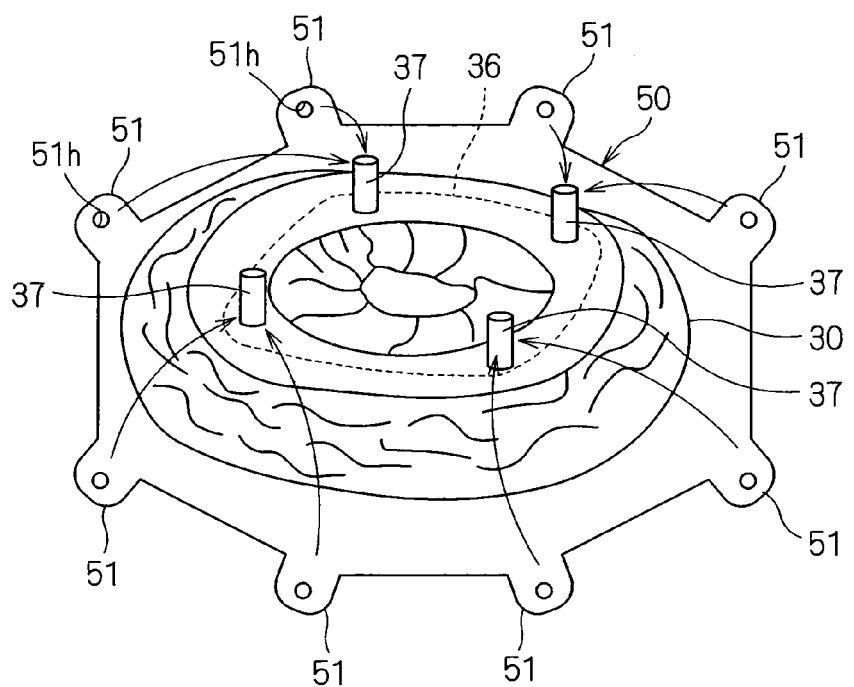
FIG. 4 is another explanatory view showing the process of enclosing the folded airbag by the holding member.
Figure 5:
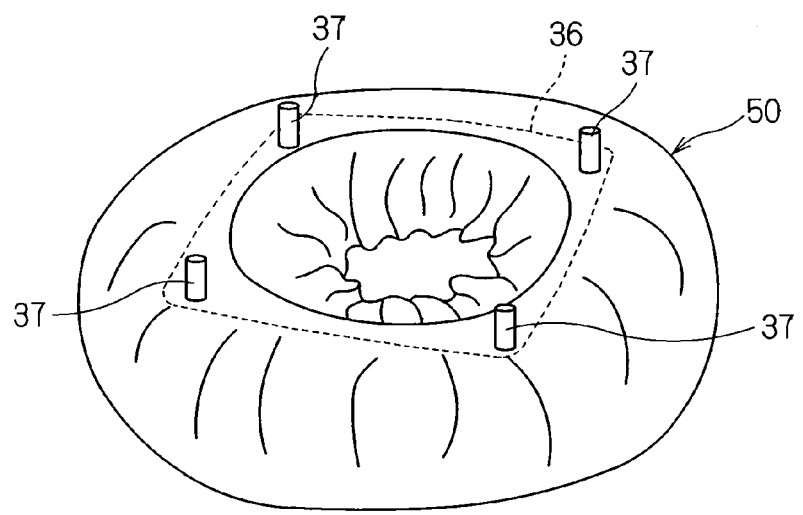
FIG. 5 is still another explanatory view showing the process of enclosing the folded airbag by the holding member.
Figure 6:
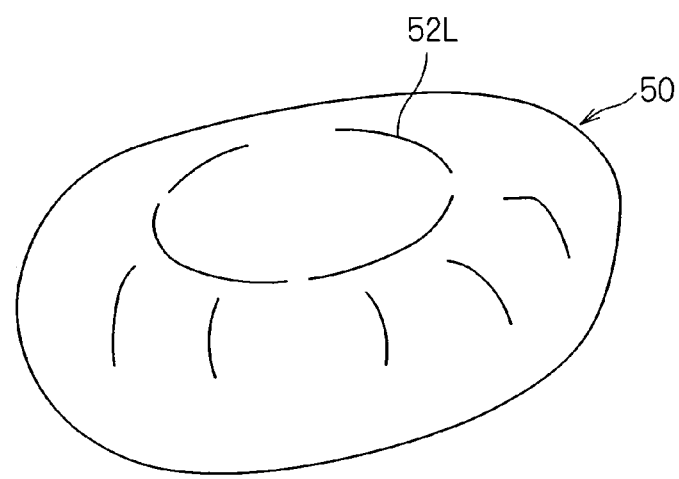
FIG. 6 is still another explanatory view showing the process of enclosing the folded airbag by the holding member.

Then, the folded airbag 30 is disposed at the central portion of the holding member 50 being spread (see FIG. 4). In this state, the holding member 50 encloses the folded airbag 30. Also, adjoining ones of the eight mounting pieces 51 of the holding member 50 are caused to overlap each other to form four pairs, and each of the pairs is moved toward the screw portion 37 of the retainer bracket 36 projecting from the airbag 30, thereby causing each screw portion 37 to be inserted through the screw insertion hole 51h of each pair (see FIGS. 5 and 6).

After that, the screw portions 37 are caused to pass through the screw insertion holes 42c of the mounting plate 40, and then, the nuts 38 are threadedly engaged with the screw portions 37. This causes each of the mounting pieces 51 of the holding member 50 to be retained between the mounting plate 40 and the retainer bracket 36 to be fixed, with the holding member 50 enclosing the folded airbag 30.

The holding member may be sewn such that a sheet-shaped member forms a rectangular parallelepiped or may be sewn such that a sheet-shaped member is sewn into a tube and closes the occupant-side opening. The holding member is only required to enclose the periphery of a folded airbag. The occupant-side portion of the holding member may be opened while an airbag is folded.

<Gas Rectifying Member>

Figure 7:
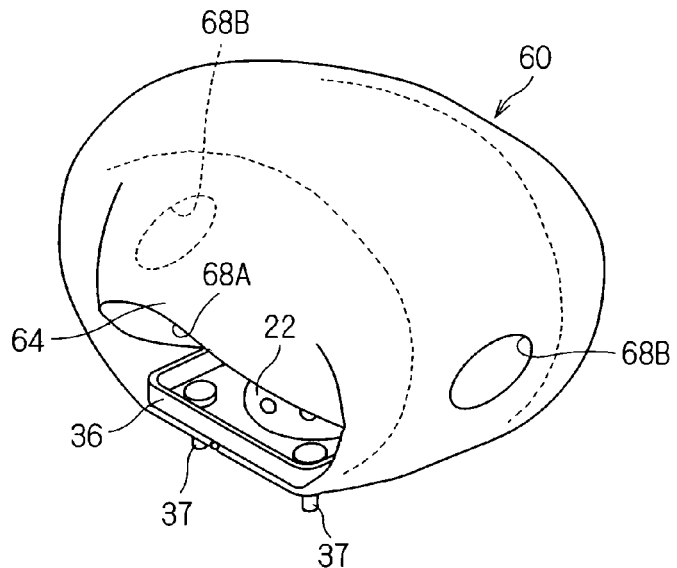
FIG. 7 is a perspective view showing a gas rectifying member.
Figure 8:
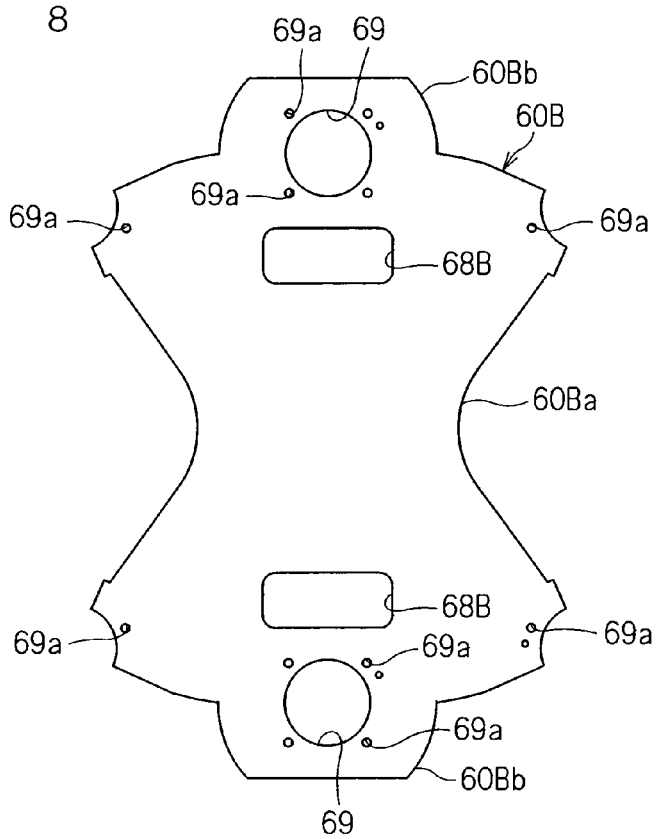
FIG. 8 is an explanatory view showing a procedure of forming the gas rectifying member from gas-rectifying-member-forming base fabric.
Figure 10:
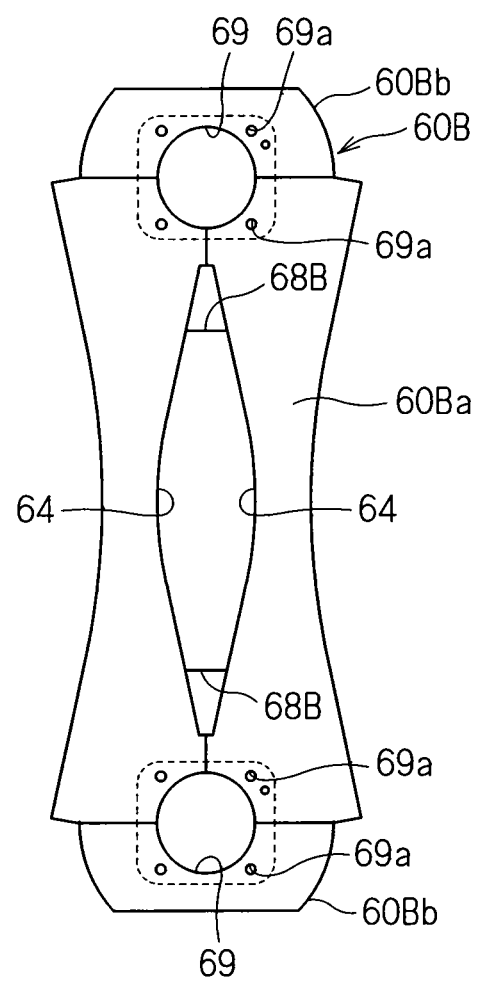
FIG. 10 is still another explanatory view showing the procedure of forming the gas rectifying member from gas-rectifying-member-forming base fabric.

The gas rectifying member 60 is described more specifically. FIG. 7 is a perspective view showing the gas rectifying member 60. FIG. 7 shows the state in which the gas rectifying member 60 inflates by the gas from the inflator 22. FIGS. 8 to 10 are explanatory views showing the procedure of forming the gas rectifying member 60 from a gas-rectifying-member-forming base fabric 60B.

The gas rectifying member 60 is formed of a flexible sheet-shaped member such as fabric or plastic sheet into an elongated shape. The gas rectifying member 60 is provided in the airbag 30 by attaching its both end portions to the portion of the airbag 30 around the opening 32h. Herein, the both end portions of the gas rectifying member 60 are retained between the retainer bracket 36 and the mounting plate 40 to be attached at the peripheral edge portion of the opening 32h of the airbag 30. The both end portions of the gas rectifying member 60 extend in the opposite directions with the opening 32h sandwiched therebetween in the airbag 30. The intermediate portion of the gas rectifying member 60 is disposed so as to cover the inflator 22 from the occupant P side in the airbag 30. In other words, the gas rectifying member 60 is disposed in the airbag 30 so as to straddle the opening 32h of the airbag 30 and the inflator 22 from the inside of the airbag 30.

Herein, the gas rectifying member 60 is disposed at a fixed position in the airbag 30 with its both end portions retained between the retainer bracket 36 and the mounting plate 40. Alternatively, a gas rectifying member may be disposed at a fixed position in an airbag with the gas rectifying member bonded to the airbag by, for example, sewing.

The gas rectifying member 60, in its initial state, is folded so as to cover the occupant-side portion of the inflator main body 23 in the folded airbag 30. The gas rectifying member 60 may be folded in a crumpled manner, a bellows or roll shape.

When a gas is generated in the inflator 22, the gas is ejected to the outer periphery of the airbag 30 through the gas ejection ports which provided at the inflator main body 23 of the inflator 22, and are disposed in the airbag 30, and is supplied to the inside of the airbag 30. Thereby, the airbag 30 initiates to inflate. At this time, the gas rectifying member 60 is provided so as to surround the inflator 22 from the inside of the airbag 30. Thus part of the gas supplied from the inflator 22 flows into the gas rectifying member 60. This causes the gas rectifying member 60 to rise in a C shape when seen from the side perpendicular to the direction in which the both end portions of the gas rectifying member 60 are connected (see FIG. 7).

In this state, the gas supplied from the inflator 22 flows into the gas rectifying member 60, and the gas rectifying member 60 controls the flow of the gas. Herein, in the rise state of the C shape, outlet ports 68A are formed at both lateral sides in the direction in which the both end portions of the gas rectifying member 60 are connected. Escape outlet ports 68B are formed between each of the both end portions and the central portion of the gas rectifying member 60. Thus, the intermediate portion of the gas rectifying member 60 is located at the occupant P side of the inflator 22 with interval, and restricts a flow of the gas from the inflator 22 toward the occupant P. In the direction perpendicular to the direction from the inflator 22 toward the occupant P, that is, at the side of the outer peripheral of the airbag 30, the outlet ports 68A and the escape outlet ports 68B are opened. Thus, the gas from the inflator 22 is rectified so as to flow toward the outer periphery of the airbag 30.

The escape outlet ports 68B may not be provided. In the case where a plurality of outlet ports are provided, in order to cause the gas rectifying member 60 to inflate as uniformly as possible toward the outer periphery of the airbag 30, the plurality of outlet ports are preferably provided at positions at which they are rotationally symmetric with respect to the central axis of the inflator 22. Herein, a total of four outlet ports including the outlet ports 68A and the escape outlet ports 68B are provided at positions about the central axis of the inflator 22, at which four symmetries are provided.

More specifically, the gas-rectifying-member-forming base fabric 60B is formed into an elongated shape (see FIG. 8). Herein, the gas-rectifying-member-forming base fabric 60B includes a base fabric main body 60Ba formed into an elongated shape and a pair of extensions 60Bb formed at the widthwise central portions of the both end portions of the base fabric main body 60Ba. The pair of extensions 60Bb extend toward the outside of the base fabric main body 60Ba.

The base fabric main body 60Ba is formed so as to have the narrowest width at the central portion in its extending direction and is also formed so as to gradually become wider from the central portion to the both end portions in its extending direction. Both side corners of the both end portions of the base fabric main body 60Ba are formed while being arcuately recessed. Around the arcuate edge portions are formed insertion holes 69a through which the screw portions 37 can be inserted.

At both end portions of the base fabric main body 60Ba are formed the outlet ports 68B for the gas.

At each of the portions extending from the both end portions of the base fabric main body 60Ba to the extensions 60Bb, an opening 69 in which the inflator main body 23 can be disposed is formed. Formed in the peripheral portion of the opening 69 are insertion holes 69a through which the screw portions 37 can be inserted.

To dispose the gas-rectifying-member-forming base fabric 60B in the airbag 30, the both side portions of the base fabric main body 60Ba are folded inwardly. Fold lines in this folding are preferably lines curved so as to be closest to the widthwise central portion of the base fabric main body 60Ba in the central portion of the base fabric main body 60Ba in its extending direction.

Then, before the peripheral portion of the opening 32h of the airbag 30 is retained between the retainer bracket 36 and the mounting plate 40, the folded both end portions of the gas-rectifying-member-forming base fabric 60B are caused to overlap the retainer bracket 36, and the screw portions 37 of the retainer bracket 36 are caused to insert through the insertion holes 69a. Then, as described above, the screw portions 37 are inserted through the holes formed around the opening 32h of the airbag 30, the screw insertion holes 51h of the holding member 50, the screw insertion holes 42c of the mounting plate 40, and the fixing holes 24h of the inflator 22. Then, the nuts 38 are threadedly engaged with the screw portions 37, so that the gas rectifying member 60 is disposed in the airbag 30 with the both end portions of the gas rectifying member 60 retained between the retainer bracket 36 and the mounting plate 40.

When a gas is supplied from the inflator 22 inside the gas rectifying member 60, the gas causes the gas rectifying member 60 to inflate. With the gas rectifying member 60 inflating, the intermediate portion of the gas rectifying member 60 in its extending direction is located at the occupant P side of the inflator 22 and restricts a flow of the gas from the inflator 22 toward the occupant P. As described above, the outlet ports 68A and 68B for gas are formed, and a gas is discharged through the outlet ports 68A and 68B toward the outer periphery of the airbag 30.

The size of the holding member 50 and the size of the gas rectifying member 60 et al. are set in such a manner that with the gas rectifying member 60 inflating, the occupant P-side portion of the gas rectifying member 60 can be located the occupant P side beyond the opening 52 of the holding member 50 and that in the above-mentioned state, at least part of the outlet port 68A can be located the occupant P side beyond the opening 52 of the holding member 50.

Consequently, the gas discharged through the outlet ports 68A is discharged toward the outer periphery of the airbag 30 at the position beyond the opening 52 of the holding member 50 at the occupant P side.

With the gas rectifying member 60 inflating as described above, the both end portions at the both lateral side portions of the gas rectifying member 60 are retained between the retainer bracket 36 and the mounting plate 40. Thus, the central portions at the both lateral side portions of the gas rectifying member 60 extend so as to face the side opposite to the occupant P (that is, the mounting plate 40 side) as they extend outwardly. The gas discharged through the outlet ports 68A is accordingly deflected by the central portions at the both lateral side portions of the gas rectifying member 60 in its extending direction so as to flow toward the mounting plate 40 while flowing toward the outer periphery of the airbag 30. The both lateral side portions at the central portions of the gas rectifying member 60 in its extending direction serve as a gas deflecting portion 64 that deflects the gas discharged through the outlet ports 68A as described above.

<Configuration for Housing Airbag>

A configuration example suitable for housing the airbag 30 is described.

Figure 11:
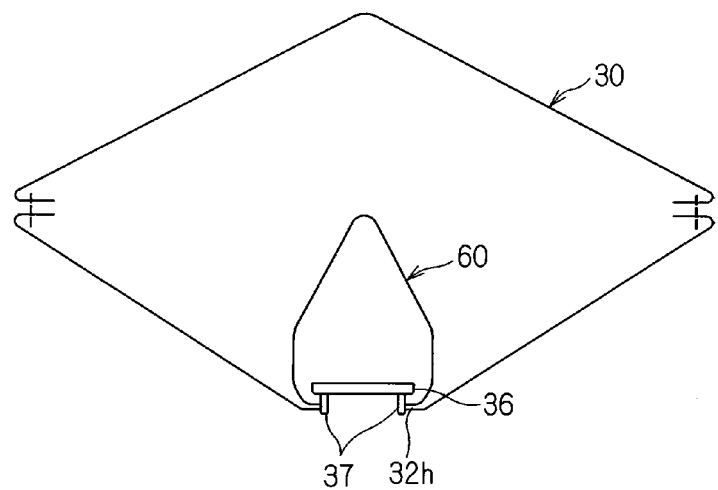
FIG. 11 is an explanatory view showing a procedure of housing an airbag.
Figure 12:
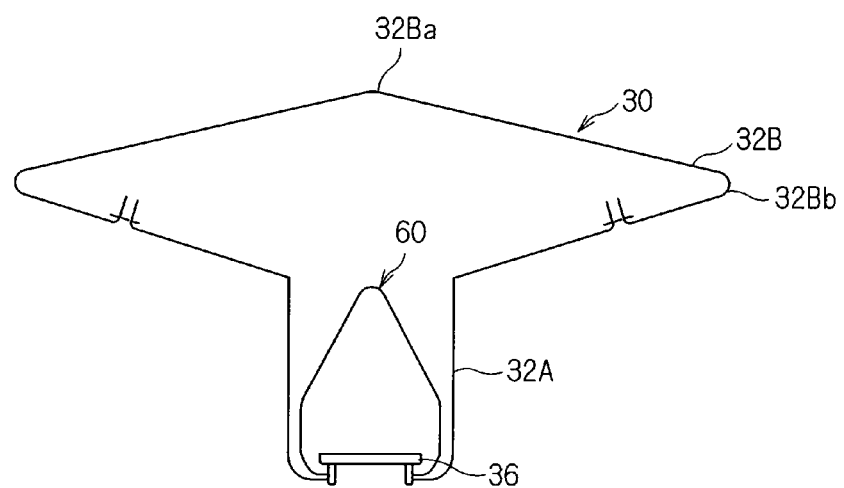
FIG. 12 is another explanatory view showing the procedure of housing the airbag.

First, as shown in FIGS. 11 and 12, the gas rectifying member 60 is disposed in the airbag 30. Then, the portion of the airbag 30, which is closer to the portion attached to the mounting plate 40, is made narrower so as to form a tube shape from the mounting plate 40 toward the occupant P (hereinafter, this portion is referred to as a plate-side portion 32A). Then, the airbag 30 is folded such that the other portion of the airbag 30 forms a disk shape so as to be thinner in the direction in which the mounting plate 40 and the occupant P are connected (hereinafter, this portion is referred to as a disk-shaped portion 32B). In this state, the bonding portions on the peripheries of the two pieces of disk-shaped base fabric constituting the airbag 30 are located closer to the mounting plate 40 than the outer periphery of the disk-shaped portion 32B.

Figure 13:
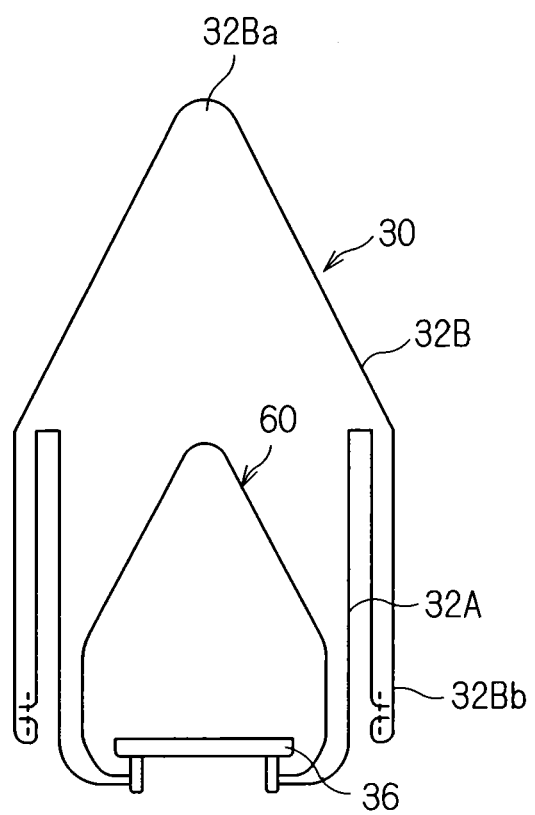
FIG. 13 is still another explanatory view showing the procedure of housing the airbag.

Then, as shown in FIG. 13, an outer peripheral portion 32Bb of the disk-shaped portion 32B is folded so as to surround the outer periphery of the plate-side portion 32A. A central portion 32Ba of the disk-shaped portion 32B, which is at the occupant P side, is drawn toward the occupant P.

Then, as shown in FIG. 14, the plate-side portion 32A, the outer peripheral portion 32Bb of the disk-shaped portion 32B, and the central portion 32Ba of the disk-shaped portion 32B at the occupant P side are folded so as to shrink in the direction in which the mounting plate 40 and the occupant P are connected. They may be folded in a crumpled manner or in a bellows shape.

It is preferable that the bonding portions on the outer peripheries of the base fabric pair with the airbag 30 folded be located closer to the mounting plate 40 than the opening 52 of the holding member 50 and face the inside of the airbag 30.

Then, as shown in FIG. 15, the holding member 50 is mounted to the screw portions 37 of the retainer bracket 36 so as to surround the folded airbag 30, and then, the mounting plate 40 is mounted.

The thus-obtained mounting plate 40 is mounted to the cover 70, thereby completing the airbag device 20.

In this airbag device 20, the portion 32Ba of the airbag 30, which faces the opening 52 of the holding member 50 during the inflation of the airbag 30, is disposed inside the opening 52 (the portion in which the rupture line 52L is formed) within the holding member 50, and the opening 52 of the holding member 50 is set to be smaller than the outer shape of the folded airbag 30. The outer peripheral portion 32Bb of the airbag 30, which is the portion around the portion 32Ba, is folded so as to shrink in the direction in which the airbag 30 projects toward the occupant P within the holding member 50. In the airbag 30, the central portion of the gas rectifying member 60 in its extending direction, being a part of the gas rectifying member 60, is disposed inside the portion 32Ba and covers the inflator 22.

<Operation>

Figure 19:
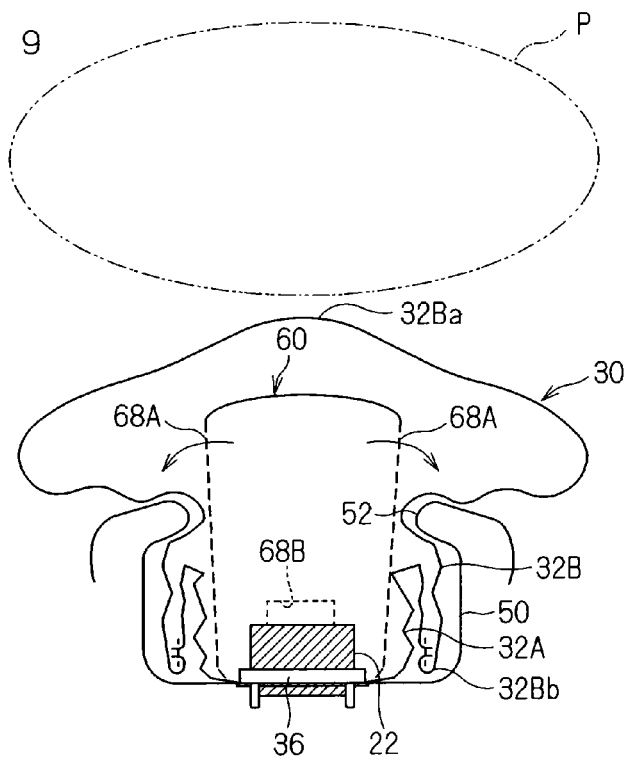
FIG. 19 is still another explanatory view showing the operation of the airbag device.
Figure 20:
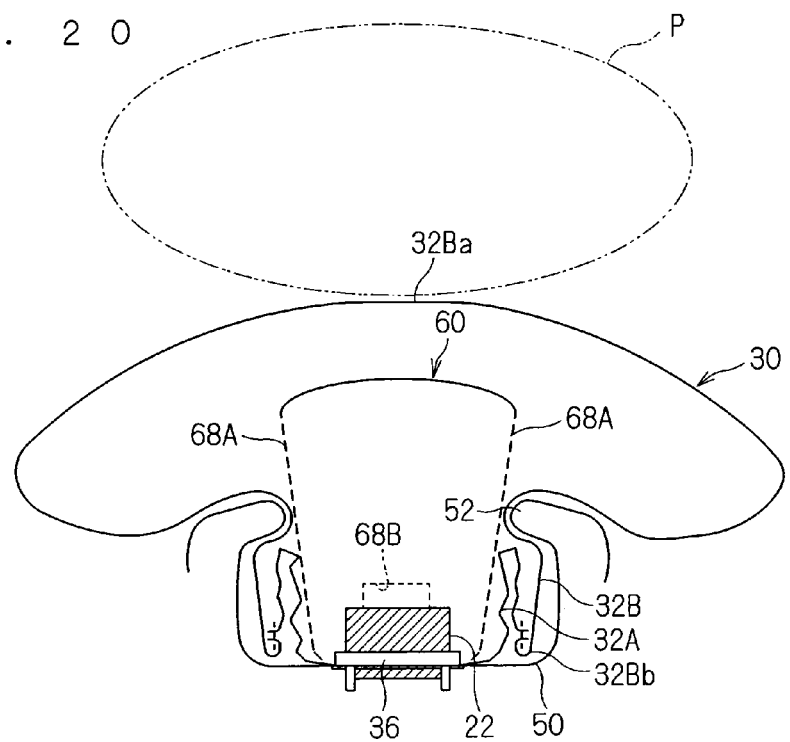
FIG. 20 is still another explanatory view showing the operation of the airbag device.
Figure 21:
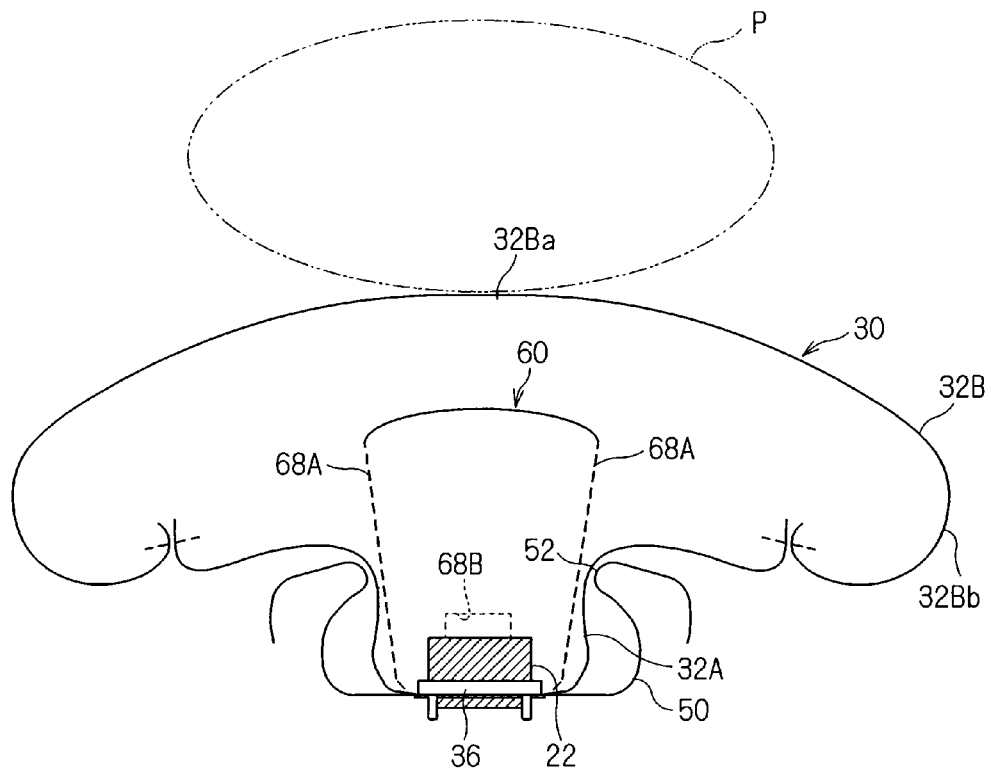
FIG. 21 is still another explanatory view showing the operation of the airbag device.

The operation of the airbag device 20 configured as described above is described with reference to FIGS. 16 to 22. FIGS. 19 to 21 show the state in which the occupant P is located OOP (the occupant is in a forward leaning position) closer to the cover 70.

Figure 16:
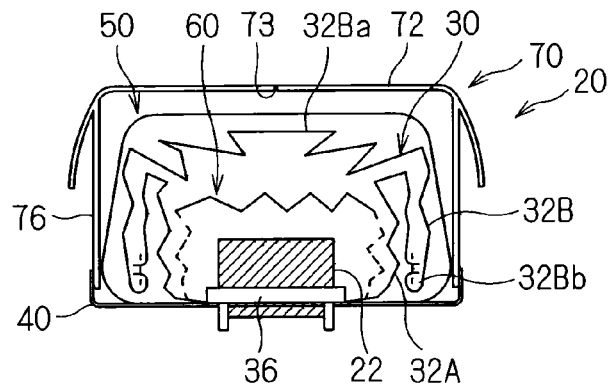
FIG. 16 is an explanatory view showing an operation of the airbag device.

First, in the initial state, as shown in FIG. 16, the airbag 30 is housed while being folded between the cover 70 and the mounting plate 40. The gas rectifying member 60 is folded while covering the inflator 22 in the airbag 30. The holding member 50 surrounds the periphery and the occupant P-side portion of the airbag 30 folded.

Figure 17:
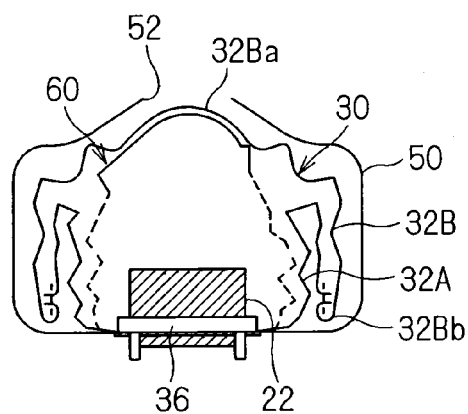
FIG. 17 is another explanatory view showing the operation of the airbag device.

When a gas is supplied from the inflator 22 in this state, as shown in FIG. 17, the gas flows into the gas rectifying member 60. Then, the gas rectifying member 60 pushes the airbag 30 from within, and the airbag 30 initiates inflating. Then, the airbag 30, which initiates to inflate so as to be pushed toward the occupant P by the gas rectifying member 60, pushes the occupant P-side portion of the holding member 50 and the backside surface of the cover 70. As a result, the holding member 50 ruptures along the rupture line 52L, thereby forming the opening 52. Also, the cover 70 tears along the tear line 73, thereby forming in the cover 70 an opening that allows the airbag 30 to inflate and deploy toward the occupant P.

At the initial stage of the inflation of the airbag 30, the holding member 50 encloses the outer periphery of the airbag 30, which restricts the inflation of the airbag 30 toward its outer periphery. Thus, the gas that has flowed into the airbag 30 flows toward the occupant P. Consequently, at the initial stage of the inflation of the airbag 30, the airbag 30 can inflate toward the occupant P relatively quickly.

Then, as shown in FIG. 18, the portion 32Ba of the airbag 30 at the occupant P side projects toward the occupant through the opening 52 of the holding member 50, and the gas rectifying member 60 attempts to rise into a C shape, so that the central portion of the gas rectifying member 60 in its extending direction projects beyond the opening 52 of the holding member 50 toward the occupant P in the airbag 30. In this state, at least part of the outlet port 68A of the gas rectifying member 60 is disposed at the position beyond the opening 52 of the holding member 50 at the occupant P side. Besides, at least part of the escape outlet port 68B may be formed at the position located beyond the opening 52 of the holding member 50 at the occupant P side.

As shown in FIG. 19, the gas from the inflator 22 flows into the gas rectifying member 60 and, at the position beyond the opening 52 of the holding member 50 at the occupant P side, is discharged toward the outer periphery of the airbag 30 in the airbag 30. In particular, the gas discharged through the outlet ports 68A is discharged so as to flow toward the mounting plate 40 while flowing toward the outer periphery of the airbag 30 by the action of the gas deflecting portion 64 (see the arrows of FIG. 19). As a result, the airbag 30 keeps inflating toward its outer periphery at the position beyond the opening 52 of the holding member 50 at the occupant P side.

Then, as shown in FIGS. 20 and 21, when the gas discharged through the outlet ports 68A of the gas rectifying member 60 is discharged toward the outer periphery of the airbag 30, the airbag 30 keeps inflating while the portion of the disk-shaped portion 32B of the airbag 30, which is at the side of the mounting plate 40, and the plate-side portion 32A of the airbag 30 are being drawn from the holding member 50. At this time, the outer peripheral portion 32Bb of the disk-shaped portion 32B and the plate-side portion 32A are folded so as to shrink in the direction in which the mounting plate 40 and the occupant P are connected, and the opening 52 of the holding member 50 is smaller than the outer shape of the airbag 30 folded. Thus, the airbag 30 folded on the outer periphery of the inflator is pressed toward the holding member 50 by the generated gas. This restricts the inflation of the airbag 30 toward the occupant through the opening 52 of the holding member 50 while being folded. As a result, the airbag 30 is drawn smoothly and gradually from the portion 32Ba facing the occupant to the outer peripheral portion 32Bb.

Although the airbag 30 also inflates somewhat toward the occupant P at this time, the central portion of the gas rectifying member 60 in its extending direction is located at the side of the inflator 22 relative to the portion 32Ba of the airbag 30 facing the occupant P. This makes it difficult for the gas from the inflator 22 to flow directly into the portion 32Ba of the airbag 30, thereby reducing rapid inflation of the airbag 30 toward the occupant P. This reduces, even for the occupant P is an OOP state, hitting of the airbag 30 against the occupant P with a strong pressure. As a matter of course, the airbag 30 inflates somewhat toward the occupant P, and thus can receive the occupant P if the occupant P in a normal position moves toward the front portion of the vehicle by an inertial pressure in a vehicle impact.

Figure 22:
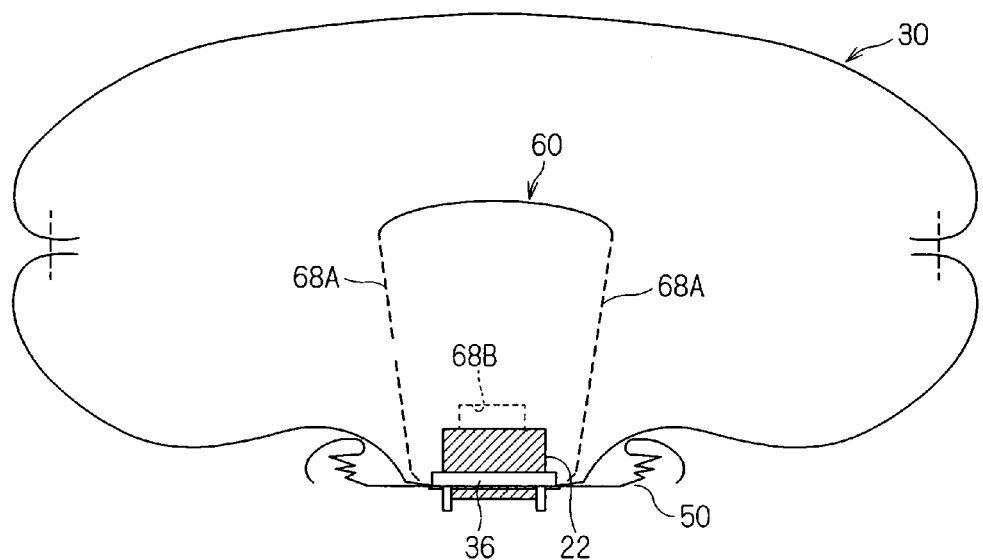
FIG. 22 is still another explanatory view showing the operation of the airbag device.

Then, as shown in FIG. 22, the airbag 30 fully deploys.

Figure 23:
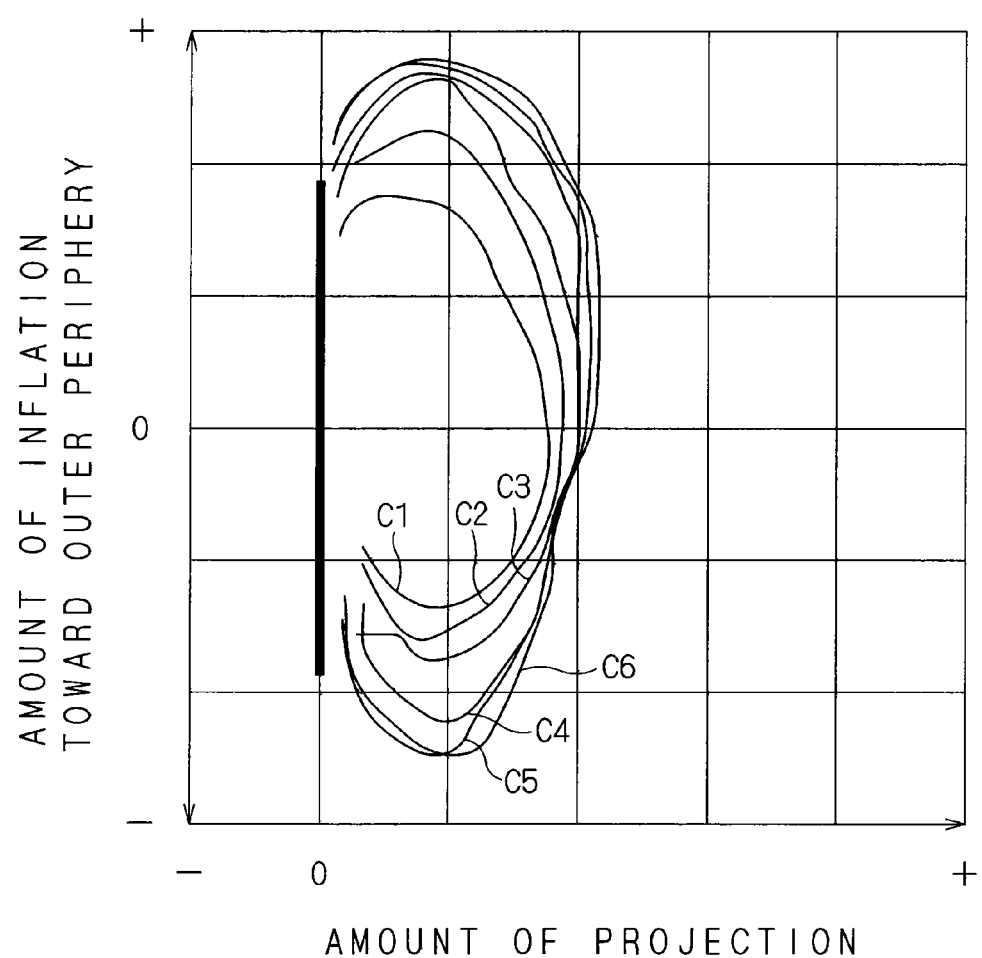
FIG. 23 is an explanatory view showing a deployment behavior of the airbag.

FIG. 23 is an explanatory view showing the inflation behavior of the airbag 30. In FIG. 23, the horizontal axis represents an amount of projection (length) by which the airbag 30 projects from the mounting plate 40 toward the occupant P, and the vertical axis represents an amount of deployment (length) by which the airbag 30 deploys toward the upper and lower outer peripheries with reference to the center of the mounting plate 40. A plurality of C-shaped curves C1 to C6 of FIG. 23 each represent changes in the amount of projection and the amount of deployment of the airbag 30 after the airbag 30 has started inflating. The curves C1 to C6 represent the amount of projection and the amount of deployment with a lapse of time in the stated order.

As shown in FIG. 23, at a relatively early stage at which the airbag 30 initiates inflating, the airbag 30 inflates somewhat toward the occupant P and its outer periphery (see curve C1). It is revealed that at subsequent stages, the airbag 30 projects toward the occupant P at a slower speed and, rapidly inflates mainly toward its outer periphery (see curves C2 to C6).

<Effects and Others>

According to the airbag device 20 configured as described above, the gas generated from the inflator 22 flows into the gas rectifying member 60, thereby causing the gas rectifying member 60 to inflate. The gas rectifying member 60 accordingly projects toward the occupant through the opening 52 of the holding member 50. Then, the airbag 30 inflates toward the occupant P through the opening 52 of the holding member 50 while being pushed by the gas rectifying member 60.

Before the airbag 30 projects toward the occupant P through the opening 52 of the holding member 50, the inflation of the airbag 30 toward its outer periphery is restricted by the holding member 50. The portion 32Ba of the airbag 30 at the occupant P side accordingly inflates toward the occupant P relatively quickly.

Then, the gas from the inflator 22 is discharged toward the outer periphery of the airbag 30 through the outlet ports 68A and 68B while a flow thereof toward the occupant P is restricted by the gas rectifying member 60. In this state, the outlet ports 68A are located at the side beyond the opening 52 of the holding member 50 and the occupant P side. Thus, the gas discharged through the outlet ports 68A is discharged toward the portion of the airbag 30 that has been pushed toward the occupant P through the opening 52 of the holding member 50 and has inflated. As a result, the portion of the airbag 30, which has remained in the holding member 50, is drawn through the opening 52 of the holding member 50. At this time, a flow of the gas from the inflator 22 toward the occupant P is restricted by the gas rectifying member 60, and is mainly discharged toward the outer periphery of the airbag 30 through the outlet ports 68A. The airbag 30 can thus deploy so as to inflate mainly toward its outer periphery while the inflation speed toward the occupant P is reduced.

Consequently, the inflation speed of the airbag 30 toward the occupant P can be reduced in the middle of and after the deployment of the airbag 30.

The gas rectifying member 60 has the gas deflecting portion 64 formed therein, and thus, can deflect the gas discharged through the outlet ports 68A such that the gas flows toward the mounting plate 40 while flowing toward the outer periphery of the airbag 30. This can more reliably restrict a flow of the gas from the inflator 22 toward the occupant P, thereby reducing the inflation speed of the airbag 30 toward the occupant P in the middle of and after the deployment of the airbag 30.

The portion 32Ba of the airbag 30 inflated, which faces the opening 52 of the holding member 50, is located inside the opening 52 within the holding member 50, and part of the gas rectifying member 60 is disposed inside the portion 32Ba. For this reason, when the gas rectifying member 60 inflates by the gas from the inflator 22, the portion 32Ba of the airbag 30 is pushed toward the occupant P through the opening 52 of the holding member 50. The outer peripheral portion 32Bb of the disk-shaped portion 32B and the plate-side portion 32A of the airbag 30 are folded so as to shrink in the direction in which the airbag 30 projects toward the occupant P within the holding member 50. Thus, the gas discharged through the outlet ports 68A of the gas rectifying member 60 causes the outer peripheral portion 32Bb of the disk-shaped portion 32B and the plate-side portion 32A of the airbag 30 to be easily drawn from the holding member 50 in order. This allows the airbag 30 to inflate smoothly toward its outer periphery.

{Modifications}

Various modifications are described on the basis of the preferred embodiment above.

Figure 24:
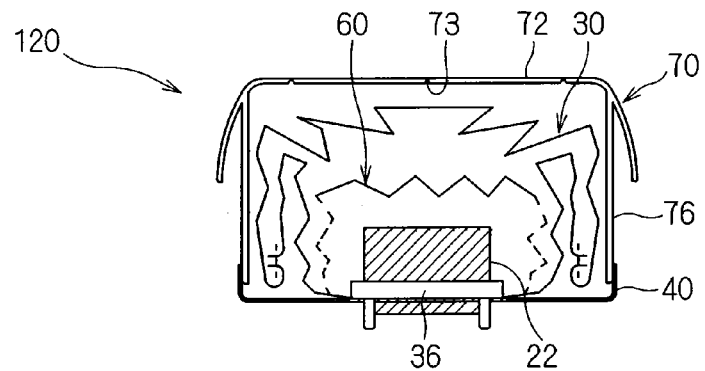
FIG. 24 is a schematic cross-sectional view showing an airbag device according to a first modification.

FIG. 24 is a schematic cross-sectional view showing an airbag device 120 according to a first modification. FIGS. 25 to 30 are explanatory views showing the operation of the airbag device 120.

The airbag device 120 according to the first modification differs from the airbag device 20 in that it does not include the holding member 50 and includes the cover 70 as a holding member.

Specifically, the airbag 30 folded is housed in the space defined by the side wall 76 between the mounting plate 40 and the cover 70 while directly facing, without the holding member 50, the cover main body 72 and the side wall 76 of the cover 70. In this state, the cover main body 72 covers the airbag 30 from the occupant side. The cover main body 72 can tear along the tear line 73 due to the inflation of the airbag 30 to form an opening 72h (see FIG. 26) that allows the airbag 30 to inflate and deploy toward the occupant. The side wall 76, which is integrally formed with the cover main body 72 at back side thereof, surrounds the folded airbag 30 and the airbag 30 being inflating. In this modification, the opening 72h is sized to be smaller than the outer shape of the side wall 76.

Also in the airbag device 120, as in the airbag device 20, the airbag 30 can deploy so as to spread in front of the occupant while the inflation speed toward the occupant is reduced in the middle of and after the deployment of the airbag 30.

Specifically, as shown in FIG. 24, the airbag 30 is housed while being folded between the cover 70 and the mounting plate 40 in the initial state. The gas rectifying member 60 is folded while covering the inflator 22 in the airbag 30. The side wall 76 and the cover main body 72 of the cover 70 that serve as a holding member surround the periphery and the occupant-side portion of the folded airbag 30.

Figure 25:
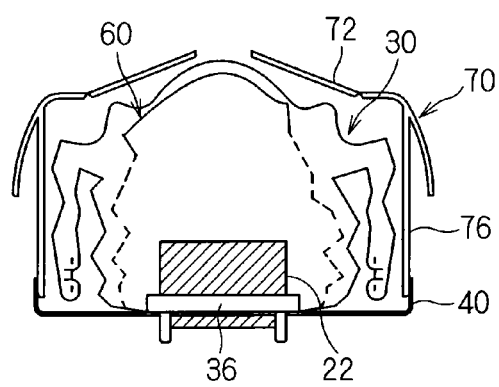
FIG. 25 is an explanatory view showing an operation of the airbag device.

When a gas is supplied from the inflator 22 in this state, as shown in FIG. 25, the gas flows into the gas rectifying member 60. Then, the gas rectifying member 60 pushes the airbag 30 from within, and the airbag 30 also starts inflating. Then, the airbag 30 that initiates to inflate in such a manner of being pushed toward the occupant by the gas rectifying member 60 pushes the backside surface of the cover main body 72. Consequently, the cover main body 72 tears along the tear line 73, thereby forming in the cover main body 72, the opening 72h that allows the airbag 30 to inflate and deploy toward the occupant.

At the initial stage of the inflation of the airbag 30, the side wall 76 encloses the outer periphery of the airbag 30, thereby reducing the inflation speed of the airbag 30 toward its outer periphery. For this reason, the gas that has flowed into the airbag 30 flows toward the occupant. At the initial stage of the inflation of the airbag 30, accordingly, the airbag 30 can inflate toward the occupant relatively quickly.

Figure 26:
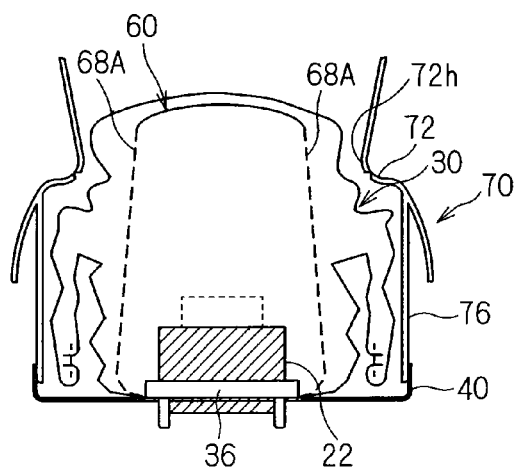
FIG. 26 is another explanatory view showing the operation of the airbag device.

Then, as shown in FIG. 26, the portion 32Ba of the airbag 30 at the occupant side projects toward the occupant through the opening 72h of the cover main body 72, and the gas rectifying member 60 attempts to stand so as to rise into a C shape, so that the central portion of the gas rectifying member 60 in its extending direction projects beyond the opening 72h of the cover main body 72 at the occupant side in the airbag 30. In this state, at least part of the outlet port 68A of the gas rectifying member 60 is disposed at the position beyond the opening 72h of the cover main body 72 at the occupant side.

Figure 27:
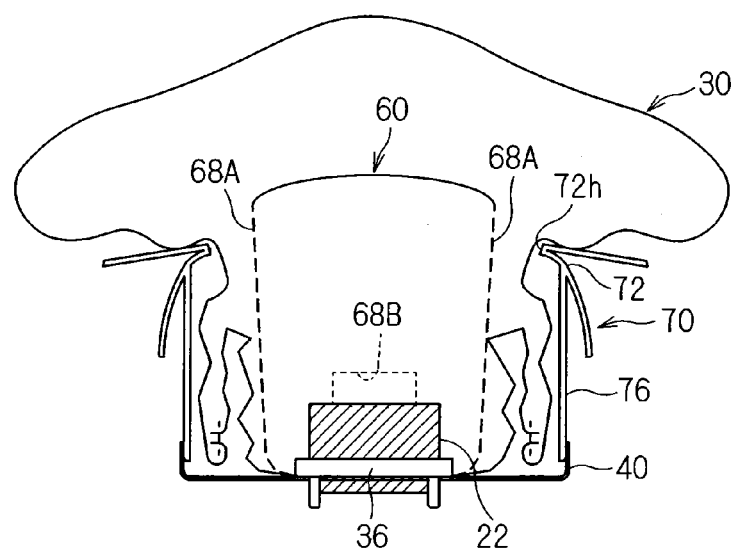
FIG. 27 is still another explanatory view showing the operation of the airbag device.

As shown in FIG. 27, the gas from the inflator 22 flows into the gas rectifying member 60 and is then discharged toward the outer periphery of the airbag 30 in the airbag 30. In particular, the gas discharged through the outlet ports 68A is discharged toward the outer periphery of the airbag 30 at the position beyond the opening 72h of the cover main body 72 at the occupant side. Moreover, the gas discharged through the outlet ports 68A is discharged so as to flow toward the mounting plate 40 while flowing toward the outer periphery of the airbag 30 by the action of the gas deflecting portion 64. This allows the airbag 30 to keep inflating toward the outer periphery at the position beyond the opening 72h of the cover main body 72 at the occupant side.

Figure 28:
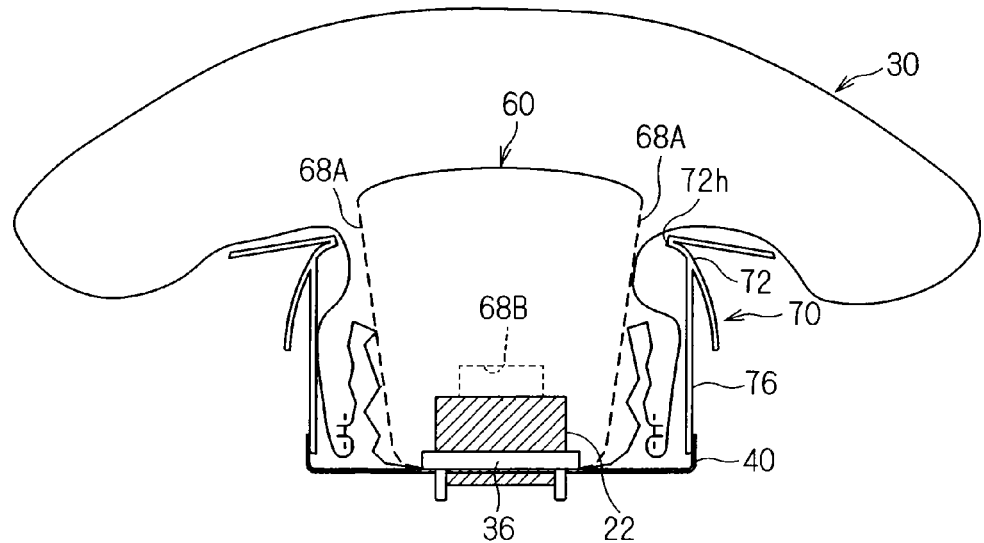
FIG. 28 is still another explanatory view showing the operation of the airbag device.
Figure 29:
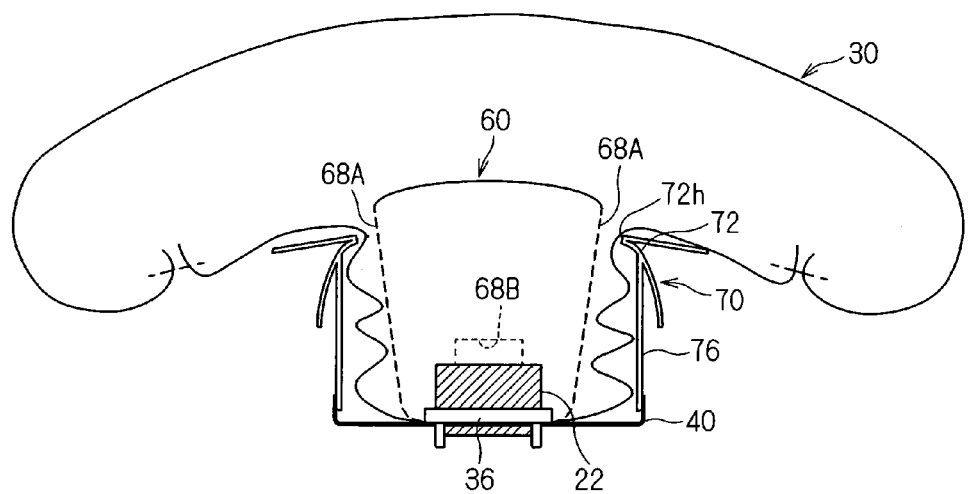
FIG. 29 is still another explanatory view showing the operation of the airbag device.

Then, as shown in FIGS. 28 and 29, the gas discharged through the outlet ports 68A of the gas rectifying member 60 is discharged toward the outer periphery of the airbag 30, and accordingly, the airbag 30 keeps inflating while the portion of the disk-shaped portion 32B, which is at the side of the mounting plate 40, and the plate-side portion 32A of the airbag 30 are being drawn from the holding member 50. At this time, the outer peripheral portion 32Bb of the disk-shaped portion 32B and the plate-side portion 32A are folded so as to shrink in the direction in which the mounting plate 40 and the occupant are connected. Besides, the peripheral edge portion of the opening 72h restricts the deployment of the airbag 30 toward the occupant because the opening 72h is smaller than the outer shape of the side wall 76. Consequently, the airbag 30 is drawn smoothly and gradually from the portion 32Ba facing the occupant to the outer peripheral portion 32Bb.

Although the airbag 30 also inflates somewhat toward the occupant at this time, the central portion of the gas rectifying member 60 in its extending direction is located at the side of the inflator 22 relative to the portion 32Ba of the airbag 30 facing the occupant. This makes it difficult for the gas from the inflator 22 to flow directly into the portion 32Ba of the airbag 30, thereby reducing a rapid inflation of the airbag 30 toward the occupant. This reduces, even for an OOP occupant, hitting of the airbag 30 against the occupant with a strong pressure. As a matter of course, the airbag 30 inflates somewhat toward the occupant, and thus can receive the occupant if the occupant in a normal position moves toward the front portion of the vehicle by, for example, an inertial pressure in a vehicle impact.

The portion of the cover main body 72, which closes the opening 72h, is pushed away by the inflating airbag 30 toward the outer periphery of the airbag 30.

Figure 30:
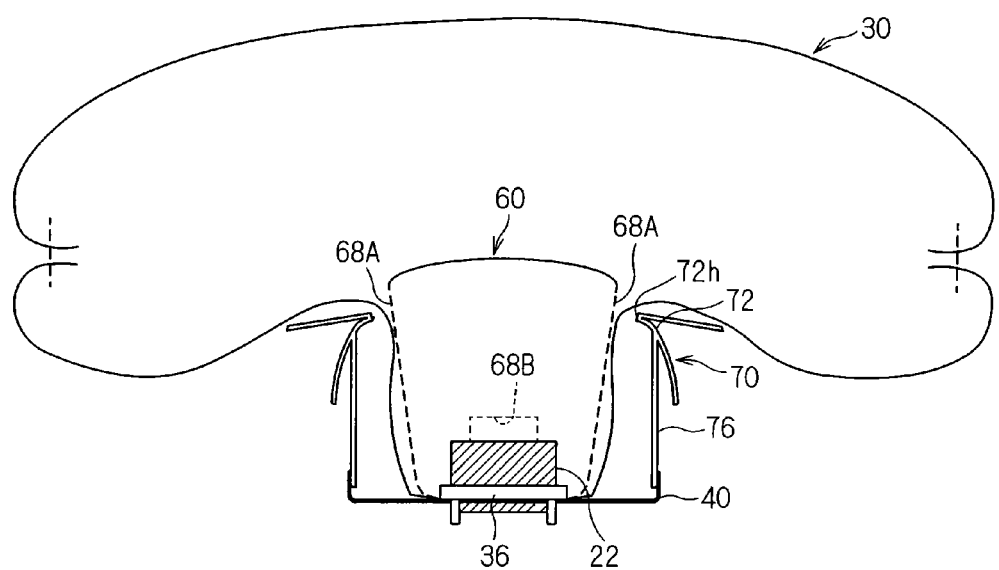
FIG. 30 is still another explanatory view showing the operation of the airbag device.

Then, as shown in FIG. 30, the airbag 30 fully deploys.

The first modification can achieve the operational advantage similar to that of the preferred embodiment above.

Besides, the cover 70 serves as the holding member 50 in the preferred embodiment above. The first modification can accordingly omit the holding member 50, leading to a cost reduction owing to reductions in the number of components, assembling man-hours, and the like.

Figure 31:
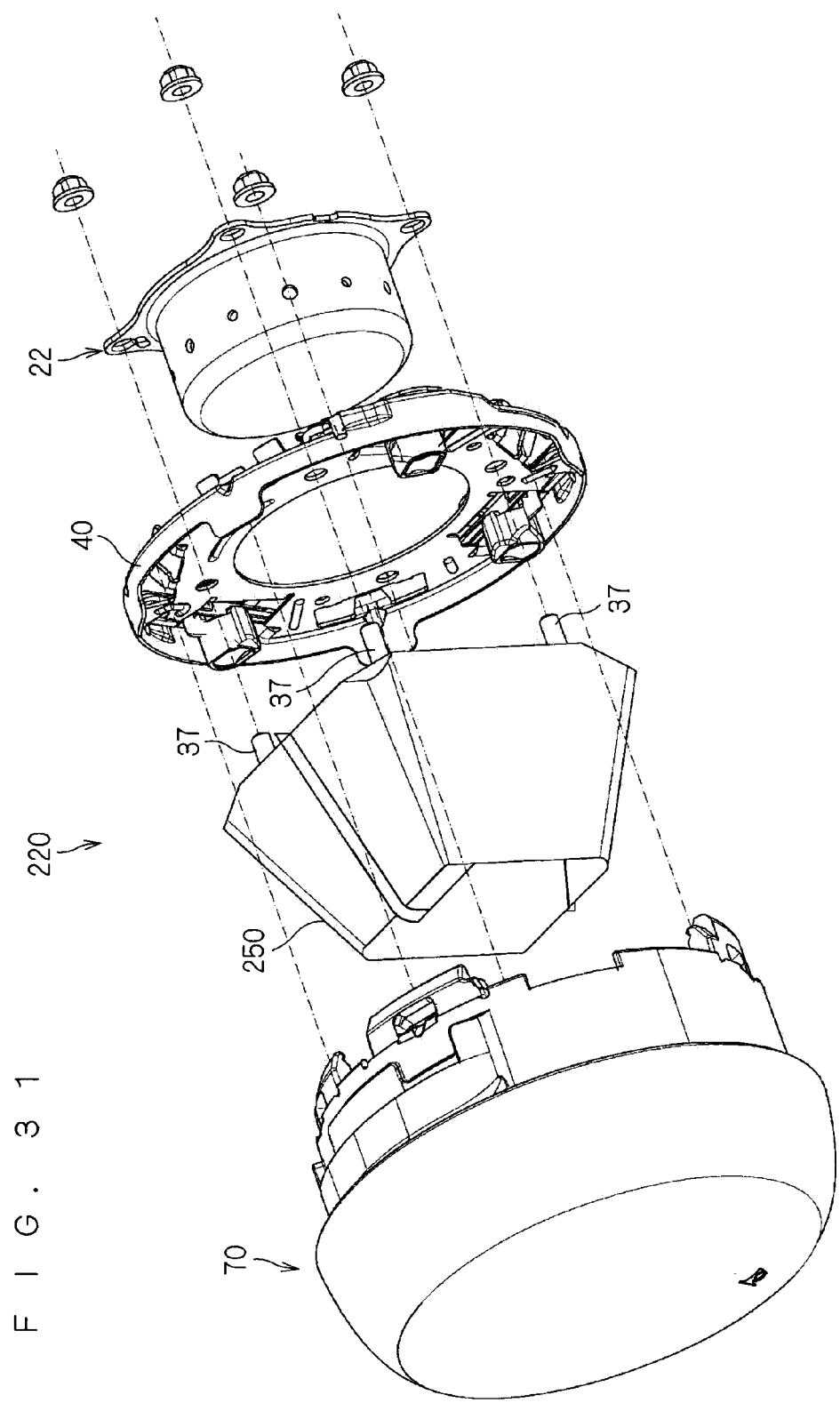
FIG. 31 is an exploded perspective view showing an airbag device according to a second modification.
Figure 32:
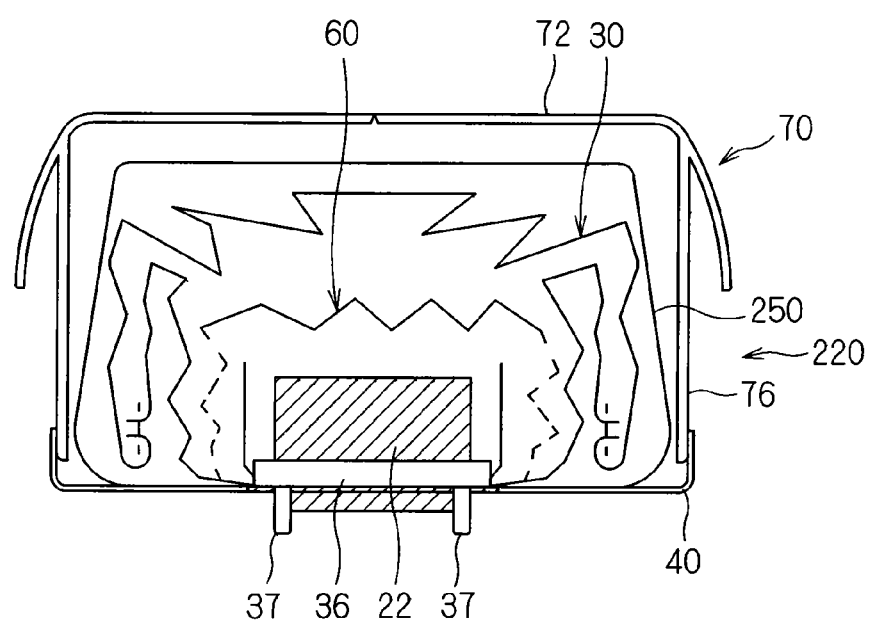
FIG. 32 is a schematic cross-sectional view showing the airbag device.

FIG. 31 is an exploded perspective view showing an airbag device 220 according to a second modification. FIG. 32 is a schematic cross-sectional view showing the airbag device 220.

The airbag device 220 differs from the airbag device 20 in the preferred embodiment above in that it includes, in place of the holding member 50, a holding member 250 described below.

Specifically, the holding member 250 is formed into a tube that becomes gradually narrower from the mounting plate 40 toward the occupant.

The holding member 250 is formed of a flexible sheet-shaped member such as fabric or plastic sheet. In the example shown in FIG. 31, the holding member 250 is shaped so as to have an outer peripheral surface of a truncated square pyramid shape and is disposed so as to become gradually narrower from the mounting plate 40 toward the occupant. The holding member may be shaped to have, for example, an outer peripheral surface of a truncated polygonal pyramid shape or a truncated cone shape.

Figure 33:
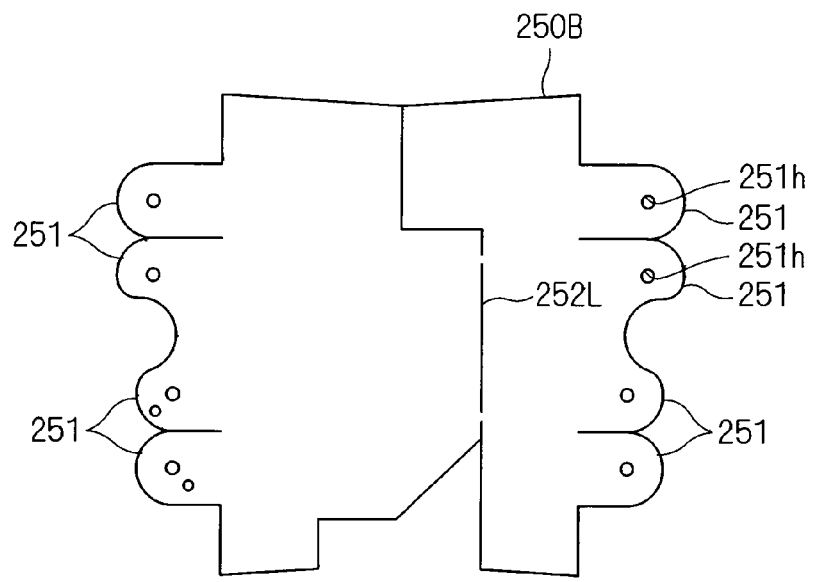
FIG. 33 shows a state in which a base fabric for forming the holding member is deployed.

An example of forming the holding member 250 is described. FIG. 33 shows a state in which a base fabric 250B for forming the holding member 250 is deployed.

The base fabric 250B is formed into a square shape and has a plurality of (here, four) mounting pieces 251 formed at each of the both side portions. Each mounting piece 251 has a screw insertion hole 251h formed therein. Formed in the base fabric 250B is a rupture line 252L that divides the base fabric 250B into two widthwise. The rupture line 252L is formed at the vertically intermediate portion of the base fabric 250B so as to pass through a position closer to one side of the base fabric 250B.

Figure 34:
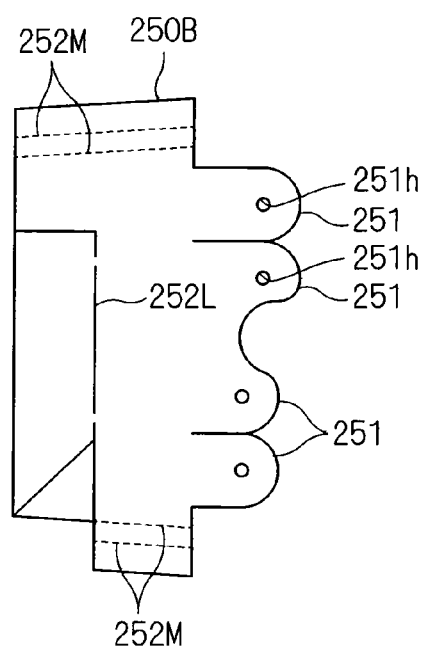
FIG. 34 shows a state in which the base fabric is folded in half and bonded.

As shown in FIG. 34, the upper and lower edge portions of the base fabric 250B are bonded by, for example, sewing while the base fabric 250B is folded in half such that its left and right portions overlap each other. Here, bonding lines 252M are formed so as to have a width gradually becoming narrower toward the rupture line 252L. The base fabric 250B is accordingly formed into the holding member 250 having a tube shape that gradually becomes thinner from the opening at the side at which the mounting pieces 251 are formed toward the side at which the rupture line 252L is formed.

With the airbag 30 folded being housed in the holding member 250, as in the preferred embodiment above, the mounting pieces 251 are caused to overlap each other two by two, and the screw portions 37 are inserted through the screw insertion holes 251h. As in the preferred embodiment above, the mounting pieces 251 of the holding member 250 are retained between the mounting plate 40 and the retainer bracket 36 to be fixed, so that the holding member 250 is mounted to the mounting plate 40.

The holding member 250 can also, when the airbag 30 inflates, rupture along the rupture line 252L to form an opening that causes the airbag 30 to inflate toward the occupant. The second modification can accordingly achieve the operational advantage similar to that of the preferred embodiment above.

In this modification, the rupture line 252L is formed at a position closer to one side of the airbag device 220, and accordingly, the opening is formed at a position closer to one side of the airbag device 220. This allows the airbag 30 to inflate in a direction closer to one side of the airbag device 220 (steering wheel). For example, the airbag 30 may be set to inflate in such a manner of becoming apart from the passenger's seat.

Figure 35:
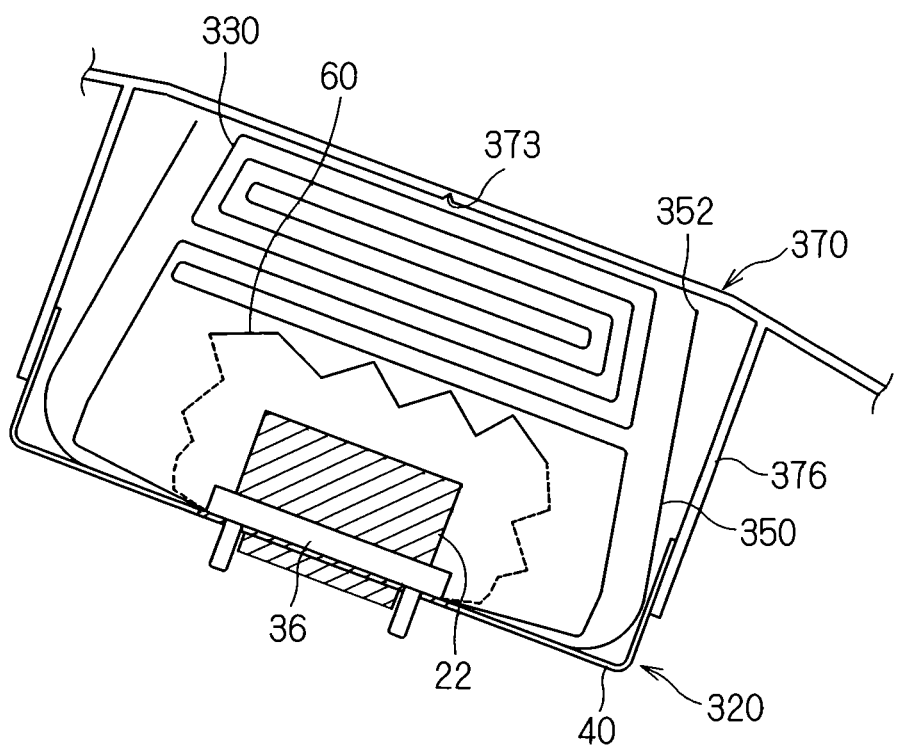
FIG. 35 is a schematic cross-sectional view showing an airbag device according to a third modification.

FIG. 35 is a schematic cross-sectional view showing an airbag device 320 according to a third modification.

Although the preferred embodiment has described an example in which the airbag device is incorporated in the steering wheel, the airbag device may be incorporated in any other portion such as the instrumental panel in front of the passenger's seat.

In the third modification, a tear line 373 is formed in an instrumental panel 370, and a side wall 376 is formed in the inside surface of the instrumental panel 370. The mounting plate 40 is mounted to the side wall 376. Consequently, the airbag device 320 is incorporated at the backside surface side of the instrumental panel 370.

In the third modification, a holding member 350 is configured such that it does not have a portion of the holding member 250 facing the instrumental panel 370 and has an opening 352 in its initial state.

An airbag 330 corresponding to the airbag 30 is folded in a bellows shape at the portion close to the inflator 22 and is formed in a roll shape at the portion close to the instrumental panel 370.

The third modification can also achieve the operational advantage similar to that of the preferred embodiment described above by the action of the gas rectifying member 60 of the airbag 330.

The configurations described in the preferred embodiment and the modifications can be freely combined as long as they are consistent with each other.

While the invention has been shown and described in detail, the foregoing description is in all aspects illustrative and not restrictive. It is therefore understood that numerous modifications and variations can be devised without departing from the scope of the invention.

What is claimed is:

1. An airbag device comprising:
   an inflator configured to generate a gas;
   an airbag configured to inflate by the gas generated by said inflator;
   a mounting plate to which said inflator and said airbag are mounted;
   a holding member that is fixed to said mounting plate, enclosing said airbag folded therein and has an opening to be formed at least when said airbag initiates to inflate, said opening allowing said airbag to inflate toward an occupant, said holding member restricting the inflation of said airbag toward an outer periphery of said airbag until the middle of the deployment of said airbag; and
   a gas rectifying member that is provided in said airbag and covering at least part of said inflator, restricts a flow of the gas from said inflator toward the occupant, and has an outlet port that discharges the gas from said inflator toward the outer periphery of said airbag,
   wherein when said airbag inflates, said gas rectifying member projects toward the occupant through said opening of said holding member, and at least part of said outlet port is located at the occupant side beyond said opening of said holding member.

2. The airbag device according to claim 1,
   wherein said gas rectifying member includes a gas deflecting portion that deflects the gas discharged through said outlet port such that the gas flows toward said mounting plate while flowing toward the outer periphery of said airbag.

3. The airbag device according to claim 1,
   wherein the opening of said holding member is smaller than an outer shape of a portion of said airbag folded, said portion facing the opening of said holding member.

4. The airbag device according to claim 3,
   wherein said holding member is an airbag cover including a cover main body and a side wall, said cover main body covering said airbag from the occupant side and being torn by the inflation of said airbag to form said opening, said side wall being integrally formed with said cover main body at back side thereof and surrounding said airbag.

5. The airbag device according to claim 1,
   wherein said airbag includes a facing portion of said airbag facing said opening of said holding member during the inflation of said airbag and being located inside said opening within said holding member, and a portion of said airbag around said facing portion is folded within said holding member so as to shrink in a direction in which said airbag projects toward said occupant, and
   part of said gas rectifying member is disposed inside said facing portion.

* * * * *